«12» United States Patent
Howard et al.

(10) Patent No.: US 7,833,493 B2
(45) Date of Patent: Nov. 16, 2010

(54) COMBUSTOR FOR COMBUSTION SYNTHESIS OF FULLERENES

(75) Inventors: Jack B. Howard, Winchester, MA (US);
David F. Kronholm, Boston, MA (US);
Anthony J. Modestino, Hanson, MA (US); Henning Richter, Dorchester, MA (US)

(73) Assignee: Nano-C, Inc., Westwood, MA (US)

( * ) Notice: Subject to any disclaimer, the term of this patent is extended or adjusted under 35 U.S.C. 154(b) by 42 days.

(21) Appl. No.: 12/127,536

(22) Filed: May 27, 2008

(65) Prior Publication Data
US 2008/0280240 A1    Nov. 13, 2008

Related U.S. Application Data

(62) Division of application No. 10/489,846, filed as application No. PCT/US02/27838 on Aug. 31, 2002, now Pat. No. 7,396,520.

(60) Provisional application No. 60/316,550, filed on Aug. 31, 2001.

(51) Int. Cl.
*C01C 1/00* (2006.01)
*C01B 31/00* (2006.01)
(52) U.S. Cl. .................. 422/150; 423/445 B; 977/842; 977/734
(58) Field of Classification Search ............. 423/445 B; 431/278–285; 110/341–348; 977/842–848
See application file for complete search history.

(56) References Cited

U.S. PATENT DOCUMENTS 4,089,637 A    5/1978    Smith et al.

(Continued)

FOREIGN PATENT DOCUMENTS

JP    2003-160316    6/2003

(Continued)

OTHER PUBLICATIONS

Baum, et al. "Fullerene Ions and Their Relation to PAH and Soot in Low-pressure Hydrocarbon Flames", Ber. Bunsenges. Phys. Chem. 96, No. 7, pp. 841-857. (1992).

(Continued)

*Primary Examiner*—Stanley S. Silverman
*Assistant Examiner*—Daniel C. McCracken
(74) *Attorney, Agent, or Firm*—Wilmer Cutler Pickering; Hale and Dorr LLP

(57) ABSTRACT

A mode of combustion and multi-component reactor to accomplish this mode of combustion are disclosed which produces fullerenes and fullerenic material by combustion. This mode consists of de-coupling an oxidation region of a flame from a post-flame region, thus giving greater control over operating parameters, such as equivalence ratio, temperature, and pressure; allows conditions of the operating parameters of the combustion reaction to be attained which would not be easily attained by conventional methods; and offers the ability to more easily stabilize the combustion reactions to allow for higher throughputs of fuel and oxidant. Several embodiments of a primary zone of a multi-component reactor are also disclosed. Said primary zone serves as the oxidation region, operates on the principle of providing recycle to the reacting combustion mixture, and which may be operated as approximately a well-mixed reactor. A secondary zone is also disclosed which provides further residence time for reaction and the ability to control operating parameters, operates on the principle of minimizing recycle of the reacting combustion mixture. The secondary zone may be operated as approximately a plug-flow reactor. The primary and secondary zones may be operated in conjunction or either one alone.

15 Claims, 13 Drawing Sheets

U.S. PATENT DOCUMENTS

| | | | | |
|---|---|---|---|---|
| 5,076,779 | A | * | 12/1991 | Kobayashi ................... 431/5 |
| 5,199,357 | A | * | 4/1993 | Garcia-Mallol ............ 110/347 |
| 5,211,932 | A | | 5/1993 | Blaylock et al. |
| 5,227,038 | A | | 7/1993 | Smalley et al. |
| 5,273,729 | A | | 12/1993 | Howard et al. |
| 5,295,816 | A | | 3/1994 | Kobayashi et al. |
| 5,300,203 | A | | 4/1994 | Smalley |
| 5,304,366 | A | | 4/1994 | Lorents et al. |
| 5,458,742 | A | | 10/1995 | Mueller et al. |
| 5,662,876 | A | | 9/1997 | Tour et al. |
| 5,985,232 | A | | 11/1999 | Howard et al. |
| 6,083,469 | A | | 7/2000 | Leftin |
| 6,089,855 | A | * | 7/2000 | Becker et al. ................ 431/9 |
| 6,210,152 | B1 | * | 4/2001 | Haffner et al. ............... 431/12 |
| 6,887,291 | B2 | | 5/2005 | Alford et al. |
| 2003/0044342 | A1 | | 3/2003 | Alford et al. |
| 2003/0143151 | A1 | | 7/2003 | Diener et al. |
| 2005/0129607 | A1 | | 6/2005 | Takehara et al. |
| 2005/0129608 | A1 | | 6/2005 | Takehara et al. |
| 2006/0140845 | A1 | | 6/2006 | Takehara |

FOREIGN PATENT DOCUMENTS

| | | |
|---|---|---|
| JP | 2003-160317 | 6/2003 |
| JP | 2003-160318 | 6/2003 |
| JP | 2003/171106 | 6/2003 |
| JP | 2003-192318 | 7/2003 |
| JP | 2003-192319 | 7/2003 |
| JP | 2003-192320 | 7/2003 |
| JP | 2003-192321 | 7/2003 |
| JP | 2003-221216 | 8/2003 |
| JP | 2003-238132 | 8/2003 |
| JP | 2004/018360 | 1/2004 |
| JP | 2006-507879 | 3/2006 |
| WO | WO-03/021018 | 3/2003 |

OTHER PUBLICATIONS

Dagaut, et al., "A Jet-Stirred Reactor for Kinetic Studies of Homogeneous Gas-Phse Reactions at Pressures up to Ten Atmospheres", J. of Phyics E: Scientific Instruments, vol. 19, pp. 207-209 (1986).

Dresselhaus. et al. Science of Fullerenes and Carbon Nanotubes, Academic Press, San Diego, CA. (1996).

Gerhardt et al."Polyhedral Carbon Ions in Hydrocarbon Flames", Chemical Physics Letters, vol. 137, No. 4, pp. 306-310 (1987).

Goel et al. "Combustion Synthesis of Fullerenes and Fullerenic Nanostructures", Carbon 40, pp. 177-182 (2002).

Goel et al. "Reaction Rate Coefficient of Fullerene (C60) Consumption by Soot", Carbon 0 (2003).

Grieco, et al. "Fullerenic Carbon in Combustion-Generated Soot", Carbon 38 pp. 597-614 (2000).

Howard et al., "Fullerenes $C_{60}$ and $C_{70}$ in flames," Nature, 352:139-141 (1991).

Howard et al., "Production of $C_{60}$ and $C_{70}$ Fullerenes in Benzene-Oxygen Flames," The Journal of Physical Chemistry, 96(26):6657-6662 (1992).

Kronholm, D, "Molecular Weight Growth Pathways in Fuel-Rich combustion", Massachusetts Institute of Technology (2000).

Kroto et al., "$C_{60}$ Buckinminsterfullerene," Nature, 318: 162-163 (1985).

Krusic et al. "Radical Reactions of C60, Science", Nov. 22,, vol. 254 (1991).

Lam, et al. "The Behavior of Polycyclic Aromatic Hydrocarbons During the Early Stages of Soot Formation" Twenty-Second Symposium on Combustion, pp. 323-332 (1988).

Longwell et al., "High Temperature Reaction Rates in Hydrocarbon Combustion," Industrial and Engineering Chemistry, 47(8):1634-1643 (1955).

Macadam, S. "Soot Surface Growth Mechanisms in Stationary Combustion Systems", Massachusetts Institute of Technology (1997).

McKinnon et al., "Combustion Synthesis of Fullerenes," Combustion and Flame, 88:102-112 (1992).

Nenniger et al., "Characterization of a Toroidal Well Stirred Reactor," Twentieth Symposium (International) on Combustion/ The Combustion Institute, pp. 473-479 (1984).

Reilly, et al. "Fullerene Evolution in Flame-Generated Soot", J. Am. Chem. Soc., vol. 122, No. 47, pp. 11596-11601 (2000).

Richter et al., "Formation of Polycyclic Aromatic Hydrocarbons and Their Growth to Soot—a Review of Chemical Reaction Pathways", Progress in Energy and Combustion Science, 26, pp. 565-608 (2000).

Richter et al. "Formation Mechanism of Polycyclic Aromatic Hydrocarbons and Fullerenes in Premixed Benzene Flames", Combustion and Flame, 119:1-22 (1999).

Richter et al., "Fabrication of fullerenes in benzene/oxygen/argon- and benzene/acetylene/oxygen/argon flames," J. Chim Phys., 92: 1272-1286 (1995).

Greico, et al. "Fullerenes and PAH in Low-Pressure Premixed Benzene/Oxygen Flames", Twenty-Seventh Symposium (International) on Combustion/The Combustion Institute, pp. 1669-1675 (1998).

Goel, et al. "Combustion Synthesis of Fullerenes and Fullerenic Nanostructures", Carbon, 40, pp. 177-182. (2002).

Kronholm. "Molecular Weight Growth Pathways in Fuel-Rich Combustion", Thesis submitted to the Massachusetts Institute of Technology, 178 pp. (2000).

* cited by examiner

COMBUSTOR FOR COMBUSTION SYNTHESIS OF FULLERENES

RELATED APPLICATION

The present application claims, under 35 U.S.C. §120, the benefit of the filing date of U.S. patent application Ser. No. 12/127,536, which claims the benefit of the filing date of U.S. patent application Ser. No. 10/489,846, which is a national phase application of PCT Application No. PCT/US02/27838, which claims the benefit of the filing date of U.S. Patent Application No. 60/316,550, filed Aug. 31, 2001, all of which are incorporated by reference herein in their entirety.

BACKGROUND OF THE INVENTION

The combustion synthesis of fullerenes was described in Nature, 352, 139-141, 1991 and U.S. Pat. No. 5,273,729, both of which are incorporated herein by reference. Data were presented for fullerene yields from subatmospheric pressure premixed laminar benzene-oxygen flames operated under different conditions of pressure, feed velocity (and hence temperature, which depends on feed velocity), diluent identity and partial pressure, carbon/oxygen ratio, and distance or residence time from the burner. Different versions of the same basic method can be envisioned depending on burner design and other process features for which many variations are possible. In general the method involves the operation of a sooting flame at pressures less than atmospheric and other conditions such as carbon/oxygen ratio, feed velocity, and concentration of inert diluent gas chosen so as to be suitable for fullerenes production. Condensible material containing fullerenes is collected from within the flame or from the effluent gas. Subsequent to the original work on combustion synthesis of fullerenes, which involves the use of premixed flames, the use of non-premixed or diffusion flames has also been found effective.

Methods for combustion synthesis of fullerenes known in the art use burner stabilized flames suitable for laboratory scale studies. The conventional combustion method for fullerene synthesis is typically carried out using low-pressure laminar premixed flame burners in which the flame is stabilized on a water-cooled burner plate. The fuel and oxidant are usually premixed upstream of the burner and fed through openings in the drilled or sintered metal plate. In some cases the fuel and oxidant are fed separately through alternating fuel/oxidant openings in the burner plate and mix together immediately downstream of the exit of the plate, either prior to entering the flame and hence giving a premixed flame or partially before and partly after entering the flame and hence giving a partially premixed and partially non-premixed or diffusion flame. In all these cases the flames are stabilized a short distance off the surface of the burner plate, and heat loss to the water-cooled burner lowers the temperature of the flame such that the flame speed, defined as the velocity of propagation of the flame into the unburned fuel-oxidant mixture, just matches the incoming velocity of the mixture being fed to the flame. The stabilization of the flame at the particular short distance from the burner where the heat loss into the burner is just the right amount to lower the temperature the correct amount to allow the flame speed to match the incoming velocity places considerable constraints on the feed velocity and other conditions required to achieve and maintain the stable flame and thereby severely limits the degrees of freedom available for configuring and optimizing the flame for particular desired performances in fullerenes synthesis. Also the rate at which the fuel/oxidant mixture can be fed to the burner, and hence the throughput of the system, is severely limited by the flame speed of the mixture. A different design that decouples flame stabilization from product formation, thereby giving more flexibility for operating and optimizing the process, while also allowing larger throughputs is highly desirable.

Low-pressure non-premixed or diffusion flames have also been used to form fullerenes. In these flames the fuel and oxidant are fed separately through different ducts or passage ways in the burner, and they mix together in a flame zone stabilized between the two streams. Both laminar and turbulent versions of these flames have been used to form fullerenes. Although fullerenes can be found within the flame zone, they tend to be destroyed by oxidation in flames where the fullerenes exit through the oxygen side of the flame zone. In flames where the fullerenes exit through the fuel side of the flame zone, they are formed in the presence of, and react with, large concentrations of soot and polycyclic aromatic hydrocarbons. Thus neither of the nonpremixed or diffusion flame types have proven interesting for practical fullerenes production.

There are many improvements possible to these types of flames for the efficient and economical production of commercial quantities of fullerenes. Notably, conventional fullerene forming flames have limited flow rates, the maximum flow rate being determined by the flame speed for the given fuel/oxidant system and temperature, with temperature being determined by heat losses from the flame. Control of reaction variables, particularly temperature, is limited, since setting flow rate and heat loss determines the temperature and also the radical flame intermediate concentrations and the time at which the fuel spends in the oxidation region. The oxidation region is important in determining the concentrations of key intermediates. The temperature and residence time necessary for oxidation reactions are not necessarily the conditions which are optimal for fullerene formation, and it would be desirable to have a degree of control over the conditions of reaction so as to favor fullerene formation, without being too constrained by the necessities of flame stabilization. A reactor that achieves higher throughputs would also be preferable to current methods, due to future higher volume requirements of fullerenic product.

By "fullerenic product", as used herein, it is meant material consisting of or including one or more of the following three types of material, structures or particles: (1) fullerene molecules such as C60, C70, C84, etc., fullerene molecules containing another atom or atoms inside or outside the fullerene cage or one or more functional groups; (2) fullerenic nanostructure or closed cage structures made up of five-member and six-member, and in some cases seven-member, carbon rings having at least one dimension on the order of nanometers, such as but not limited to single or multilayered nanotubes and nanoparticles as defined in U.S. Pat. No. 5,985,232, columns 3 and 4, and (3) fullerenic soot consisting of spheroids or spherules of carbon made up of curved carbon sheets or layers which have substantial fullerenic character. The spherules have dimensions similar to conventional carbon black and thermal black, that is, in the range of 5 nm to 1000 nm. Fullerenic character is noted by the presence among six-member and sometimes seven-member rings of five-member carbon rings which result in curved sheets of carbon.

Another important requirement for the commercial manufacture of fullerenes is an increase in the yield of fullerenic product for a given quantity of carbon fed as fuel. Currently, the highest reported yields are ~0.5% of total carbon fed. A combustion reactor allowing a greater degree of control over the combustion reactions and better maintenance of conditions that favor or promote larger fullerene yields would be preferable to conventional systems. Jet-stirred reactors which approximate a well-mixed combustion reactor have been used extensively in experimental combustion work, beginning with Longwell (Ind. Eng. Chem., 47, 1634, 1955)), but fullerenes have never been synthesized in a well-mixed combustion reactor. Neinninger (Proceedings of the Combustion Institute 20:473-479, 1984) and Dagaut, et al (J. Phys. E.: Sci. Instrum. 19, 207-209, 1986) are recent designs. Current jet-stirred reactors used in combustion are designed for atmpospheric pressure conditions with turbulent gas flows from the jets and turbulent flow conditions within the reactor. Turbulence greatly increases the rate of diffusion and thus enhances micro-mixing. Turbulence enhanced micro-mixing is the primary method relied upon to create a well-stirred condition in existing jet-stirred reactors. Practically significant amounts of combustion generated fullerenes have only been found in low-pressure conditions (10-100 ton), for which the previous jet-stirred reactor designs would be inadequate in the amount of mixing and recycle accomplished because of the much lower densities and hence lower Reynold's numbers at the low pressures of fullerene formation, and turbulence is not adequate as the primary method of back-mixing or recycle. A jet-stirred reactor that can accomplish adequate recycle or back-mixing at low pressures, without relying primarily on turbulence enhanced micro-mixing is needed.

Lam (Proceedings of the Combustion Institute 22:323-332, 1988) describes a jet-stirred reactor/plug-flow reactor system. This system was used as a laboratory tool for atmospheric pressure studies of polycyclic aromatic hydrocarbon and soot formation using primarily ethylene as the fuel. Total residence times in this system were of the order 5 ms in the jet-stirred reactor and 15 ms in the plug-flow section. Due to the high flow rates and low residence times, flow in the plug-flow section was turbulent, and due to the low residence times, external heating was not required to assume that temperature was isothermal in the plug-flow section. Such a coupled well-mixed/plug-flow reactor system has not been used at low pressures nor at residence times greater than 20 ms, and fullerenes have never heretofore been synthesized using a well-stirred/plug-flow reactor configuration.

SUMMARY OF THE INVENTION

The present invention relates to a mode of combustion and a multi-component reactor to carry out this mode of combustion that overcomes the limitations of conventional methods. The method of the present invention allows large-scale production of fullerenes and may produce fullerenes in higher yield than conventional methods.

An aspect of the present invention is the use of a reaction chamber termed the primary zone to carry out the initial phase or the entire process of the combustion synthesis of fullerenic product.

In the primary zone a recycle or back-mixing is accomplished by mixing and reaction of later residence time combustion products ("first combustion products") with fuel and/or oxidant, and/or earlier residence time combustion products ("newly formed combustion products,") and/or unreacted residue.

The primary zone may be operated in conjunction with a secondary zone. In the secondary zone, combustion products of later residence time do not mix or react with combustion products of earlier residence time.

It is an object of the present invention to provide a method of producing fullerenes by combustion, including introducing carbon-containing fuel and oxidant at an introduction location into a primary zone so that the fuel and the oxidant react to produce first combustion products, the first combustion products and unreacted residue being mixed and reacted with incoming carbon-containing fuel and oxidant and/or any newly formed combustion products and/or unreacted residue, thereby forming a combustion mixture, and introducing the combustion mixture into a secondary zone for collection or further processing.

It is another object of the present invention to provide a method of producing fullerenes by combustion, including introducing carbon-containing fuel and oxidant at an introduction location into a primary zone so that the fuel and the oxidant react to produce first combustion products, the first combustion products and unreacted residue being mixed, and reacted with incoming carbon-containing fuel and oxidant and/or any newly formed combustion products and/or unreacted residue, thereby forming a combustion mixture; introducing the combustion mixture into a secondary zone; and allowing constituents of the combustion mixture in the secondary zone to undergo reactions for a residence time to produce a stream including second combustion products comprising fullerenes and other material, wherein the stream flows through the secondary zone such that mixing and reaction are minimized between material from different regions corresponding to different residence times in the secondary zone, under conditions to promote and/or favor fullerene production. Fuel and/or oxidant and/or additives may be injected at a location in the secondary zone to promote and/or favor fullerenic product formation.

It is yet another object of the present invention to provide a method of producing fullerenes by combustion including introducing carbon-containing fuel and oxidant at an introduction location into a primary zone so that the fuel and the oxidant react to produce first combustion products, thereby forming a combustion mixture; introducing the combustion mixture into a secondary zone; and allowing constituents of the combustion mixture in the secondary zone to undergo reactions for a residence time to produce a stream including second combustion products comprising fullerenes and other material, wherein the stream flows through the secondary zone such that mixing and reaction are minimized between material from different regions corresponding to different residence times in the secondary zone, under conditions to promote fullerene production. Fuel and/or oxidant and/or additives may be injected at a location in the secondary zone to promote and/or favor fullerenic product formation.

It is a further object of the present invention to provide a combustor including a chamber having a first injection inlet for injecting a first feed into the chamber and a second injection inlet for injecting a second feed into the chamber, the first injection inlet being positioned so that the first feed is directed so as to partially overlap the second feed so that earlier residence time material of the second feed mixes and reacts with later residence time material of the first feed.

It is another object of the present invention to provide a combustor including a chamber having a first injection inlet for injecting a first feed into the chamber and a second injection inlet for injecting a second feed into the chamber, the first injection inlet being positioned with respect to the second injection inlet so that the first feed supplies early residence time material to be entrained into later residence time material of the second feed, later residence time material to be entrained into early residence time material of second feed, and intermediate residence time material to be entrained into intermediate residence time material of second feed. The first injection inlet may be further positioned so that the amount of entrainment of the second feed is enhanced by the flow of the first feed.

DETAILED DESCRIPTION OF THE INVENTION

Figure 1:
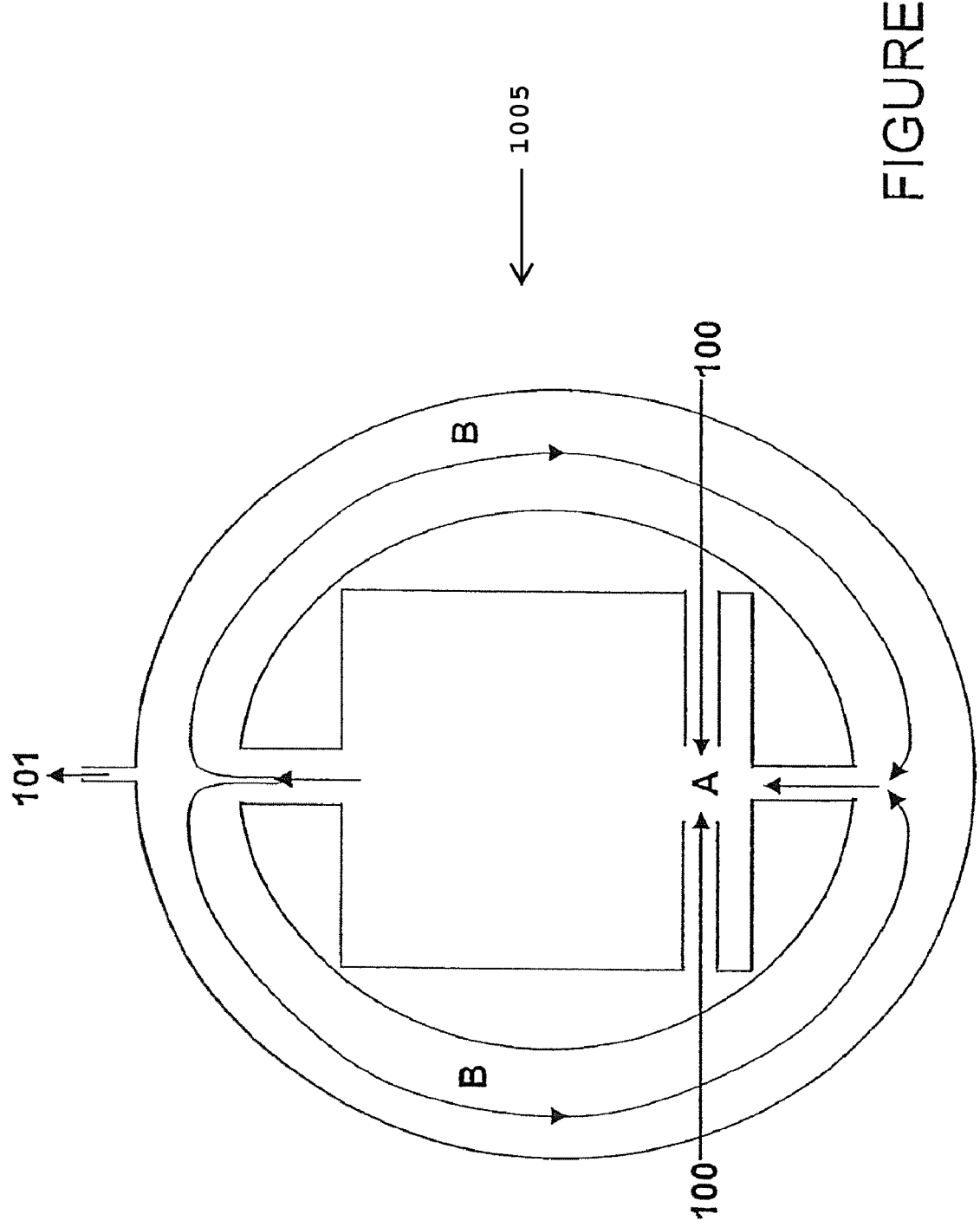
FIG. 1 shows a primary zone reactor where the mixing and reaction of first combustion products (from B) with entering fuel and/or oxidant, and/or newly formed combustion products, and/or unreacted residue (at A) is accomplished by a physical recycle loop.

Some terms used in the description of the invention are defined as follows:

"First combustion products" as used herein means intermediates of oxidation such as CO, $CO_2$, $H_2O$, O, OH, and other light stable and radical gas species, such as $CH_4$, $C_2H_2$, $C_2H_4$, $C_3H_4$, $C_4H_2$, $C_4H_4$, $C_5H_6$, CHO, $CH_3$, $C_2H$, HCCO, $C_3H_3$, $C_3H_2$, $CH_2CO$, $C_4H_3$, $C_5H_5$ as well as other small hydrocarbon and oxygen-containing radicals and stable molecules; stable and radical polyacetylenes or polyynes ($C_nH_2$, n=5, 6, . . . ) and aromatic species such as $C_6H_5$, $C_6H_6$, $C_6H_5O$, $C_6H_5OH$, $C_6H_5CH_2$ and $C_6H_5CH_3$, and polycyclics such as indene, naphthalene, phenanthrene, fluoranthene, and larger such species as well as radicals of these and related species, and soot and soot precursors; first combustion products are the products of combustion of either a fullerene-forming or non-fullerene-forming fuel.

"Unreacted residue" as used herein refers to unreacted fuel, unreacted first or early combustion products and hydrocarbon or partially oxygenated hydrocarbon products produced from the fuel or from first or early combustion products. Unreacted residues may include molecular weights ranging from those of the fuel and the first and early combustion products to higher molecular weight aliphatic, aromatic, polyaromatic, and oxygenated molecular and particulate material.

"Newly formed combustion products" can be any or all of the compounds mentioned above in the definition of first combustion products, but in the concentrations and proportions corresponding to an earlier residence time of combustion than the first combustion products.

"Oxidant" as it is used here refers to the oxidizing agent fed to the combustor. Once in the combustor the oxidant can be assumed either to participate directly, i.e., as a reactant, in oxidation reactions or it may be converted to other oxidizing species which in turn participate as reactants in oxidation reactions. The most preferred oxidant in fullerenes synthesis by combustion is molecular oxygen or $O_2$, which may be fed as pure $O_2$, as air, as $O_2$ mixed with one or more inert gases, as $O_2$-enriched air, as air partially depleted of its original nitrogen, or in other mixtures. The $O_2$ may serve as the oxidizing reactant in the combustor or it may be converted to some extent to OH, O, $HO_2$, $H_2O$, $CO_2$, or other oxygen-containing species which in turn serve as reactants in oxidation reactions. Other oxidants of some interest under certain conditions as feeds for a fullerenes synthesis combustor are hydrogen peroxide ($H_2O_2$), ozone ($O_2$), and mixtures of these with an inert gas and/or one or more of the species OH, O, $HO_2$, $H_2O$, $CO_2$, or other oxygen-containing radicals or stable molecules.

"Fullerene-forming fuel" is defined as fuel which produces combined yields of fullerenes $C_{60}$ and $C_{70}$ of at least 0.00001% of the fuel carbon under combustion conditions known from the literature to be suitable for fullerenes formation in flames. Fullerene-forming fuels include aromatic and other highly unsaturated hydrocarbons such as, but not limited to, the following: benzene, toluene, xylenes, naphthalene, biphenyl, phenanthrene, anthracene, pyrene and other single-ring aromatics and polycyclic aromatics; compounds with five-membered rings either alone, as in cyclopentadiene, or in combination with six-membered rings as in indene, acenaphthyene, fluorene, fluoranthene, cyclopentaphenanthrene, etc.; compounds containing four-membered rings such as biphenylene; oxygen containing aromatics, acetylene and polyacetylenes or polyynes ($C_{11}H_2$, n=2, 3, 4 . . . ); any of the foregoing fuels with functional groups or additional functional groups such as methyl, vinyl, ethynyl, propargyl, phenyl, naphthyl, etc.; heavy petroleum, kerogen, bitumen, coal and other fossil fuels with considerable aromatics content; light oils, intermediate oils, heavy oils or tars, chars, cokes, carbon blacks, and soots derived from fossil fuels and biomass fuels; and products including stable species and radicals of hydrocarbons pyrolysis and partial or incomplete combustion.

"Non-fullerene-forming fuel" is defined as fuel which produces combined yields of fullerenes C60 and C70 less than 0.00001% of the fuel carbon under combustion conditions know from the literature to be suitable for fullerenes formation in flames. Non-fullerene-forming fuels include, but are not limited to, saturated, partially unsaturated and nonaromatic hydrocarbons such as methane, ethane, propane, ethylene, etc.)

The present invention provides a method of producing fullerenes by combustion including introducing carbon-containing fuel and oxidant at an introduction location into a primary zone so that the fuel and the oxidant react to produce first combustion products, the first combustion products and unreacted residue being mixed and reacted with incoming carbon-containing fuel and oxidant and/or any newly formed combustion products and/or unreacted residue, thereby forming a combustion mixture; introducing the combustion mixture into a secondary zone; and allowing constituents of the combustion mixture in the secondary zone to undergo reactions for a residence time to produce a stream including second combustion products comprising fullerenes and other material, wherein the stream flows through the secondary zone such that mixing and reaction are minimized between material from different regions corresponding to different residence times in the secondary zone, under conditions to promote fullerene production. Fuel and/or oxidant and/or additives may be injected at a location in the secondary zone to promote and/or favor fullerenic product formation. A vacuum pump is connected at a point downstream of the secondary zone to maintain a pressure lower than atmospheric.

The primary zone can be used to either (1) mix and react first combustion products with fuel and/or oxidant, and/or newly formed combustion products, and/or unreacted residue of a single or multiple similar flows, or (2) effect the mixing and reaction of a first combustion product of one type (for example the intermediate products of combustion of a non-fullerene-forming fuel) with fuel and/or oxidant, and/or newly formed combustion products, and/or unreacted residue of another type, such as a fullerene-forming fuel, or vice versa. Different incoming streams may be unreacted fuels of either fullerene-forming fuels or non-fullerene-forming fuels, or intermediates of combustion, such as the effluent of another combustor.

An essential aspect of the primary zone is that a proportion of the carbon in a fullerene-forming fuel either in the primary zone or elsewhere, which may proceed via oxidation to combustion and fullerene intermediates and thence fullerenes, is allowed to proceed via a more direct route to fullerene intermediates and thence fullerenes by the fullerene-forming fuels or its products being allowed to mix and react with intermediates of combustion, these intermediates having been formed by either the same fullerene-forming fuel, another fullerene-forming fuel stream, or a non-fullerene-forming fuel stream.

Another essential aspect of the primary zone is that a fullerene-forming fuel may be allowed to mix and react with combustion intermediates, such as radical species, more efficiently so as to allow for more control over the stabilization of the flame through control over the fuel oxidation zone. This allows for a higher degree of flame stability and allows for higher throughputs of fuel and oxidant than with conventional flame systems used for fullerenic product synthesis, such as burner stabilized or nozzle type flames.

By greater control over the oxidation zone, conditions can also be more easily attained which promote and/or favor fullerenic product formation. In this sense, to promote fullerenic product formation refers to an increase in the rate of formation of fullerenic product formation, and to favor fullerenic product formation refers to the reduction of by-product or by-products formation rate or rates.

The entering streams to the primary zone may be either pre-mixed streams of fuel and oxidant, separate fuel and oxidant streams, or different fuels either pre-mixed or separately added, with oxidant pre-mixed or separately added. Inert diluents or additives may also be used, either pre-mixed with any of the fuel and/or oxidant streams or added separately.

Additives effective for soot suppression are of interest for the enhancement of fullerenes formation in combustion. Examples of additives of this type are compounds which contain the metals manganese, iron, or barium.

Some compounds containing these metals, such as for example iron pentacarbonyl, both retard soot formation and promote the formation of polycyclic aromatic hydrocarbon structures which may serve as fullerene precursors. More generally, metals from groups I and II of the Periodic Table as well as transition metals are of interest as fullerene-formation enhancement additives.

Additives containing metals of low ionization potential, such as alkali metals and alkaline earth metals are of interest for addition in the secondary zone. Use of these additives provides a means for increasing the ionization, and decreasing the coagulation, of soot precursors and soot particles, thereby allowing more time for some of the carbon that would otherwise be consumed in soot formation to instead contribute to fullerenes formation.

Another class of additives of interest for the enhancement of fullerenes formation in flames are flame inhibitors such as but not limited to HBr, SF6 (6 is a subscript) and halogen-containing compounds including but not limited to $CX_xY_yZ_z$ where x+y+z=4 and X, Y, and Z may be H, F, Cl, Br, or I. These and other flame inhibitors are of interest as additives to promote fullerenes formation because they reduce the concentration of key flame propagation radicals such as H and OH. These radicals retard fullerenes formation by attacking and destroying fullerene formation intermediates, so removal of these radicals by additives enhances fullerenes formation.

Still another class of additives of interest are additives which promote the formation of fullerene precursors. Examples are cyclic aromatic acid anhydrides which promote the formation of five-membered rings in polycyclic aromatic structures of the type needed in fullerenes formation.

Certain metal additives such as cobalt, iron and nickel are known to enhance the formation of other fullerenic products (defined elsewhere) including single-walled carbon nanotubes. These additives are of interest here since not only fullerenes but also other valuable fullerenic products can be produced by the method of this invention.

Fullerenic product or fullerenic product intermediates may be formed in the primary zone, the fullerenic product being later collected (as with a method described in U.S. Provisional Application No. 60/393,494, incorporated herein by reference) or the fullerenic product and/or fullerenic product intermediates being processed in another reactor for further reaction under the same or different conditions, such as another primary zone operating at a different temperature or pressure or residence time, or another type of reactor zone. Alternatively, a non-fullerene forming fuel could be used in a primary zone to produce intermediates useful in forming fullerenes, these intermediates then being mixed and reacted with a fullerene-forming fuel in a region after the primary zone that forms the above-mentioned fullerene intermediates. Alternatively, a conventional flame system could be used to provide combustion intermediates to the primary zone, where a fullerene-forming fuel is added and mixed and reacted with the combustion intermediates. The primary zone functions both to provide a degree of recycle or back-mixing to a given entering stream, and also to allow the mixing of different streams, such as intermediates of one fuel with another incoming fuel stream.

The effects of a zone to accomplish recycle and back-mixing are several in the case where it is used to produce fullerenes without the use of a non-fullerene-forming fuel, namely, (1) more efficient flame stabilization by the contacting of entering fuel and/or oxidant with reactive flame intermediates present in the first combustion product. This arrangement overcomes the limitations of flame speed which limit throughput in burner stabilized or nozzle type flames; (2) in the case where a fullerene-forming fuel can react in (at least) two different pathways, one leading to products of oxidation ($CO$, $CO_2$, $H_2O$, OH, H, and other products) and another leading to fullerenes via intermediates, it is desirable to enhance the amount of fuel that is spent in the fullerene pathway rather than the oxidation pathway. Mixing and reaction of the entering fuel and/or oxidant and newly formed combustion products and un-reacted residue with intermediates of combustion and/or fullerene formation found in the first combustion product may increase the rates of these fullerene formation pathways relative to the oxidation and by-product reactions.

In the case where the primary zone is used to provide mixing and reaction of a non-fullerene-forming fuel with a fullerene-forming fuel, the primary zone acts as a flame stabilization and mixing chamber, whereby the fullerene-forming fuel can be added to reactive combustion intermediates and conserved for fullerene formation pathways, with less loss of the fuel to maintain the combustive mixture, with resultant loss of the fullerene-forming fuel to products of oxidation such as H, OH, O, etc., which are necessary to stabilize the flame.

It is desirable but not necessary to fall within the scope of this invention to mix and react first combustion products with fuel and/or oxidant, and/or newly formed combustion products, and/or unreacted residue such that there are regions within the primary zone, of at least 10% of the total primary zone volume, which have one or more state variables approximately constant, so that at least 10% of the primary zone approximates a well-stirred reactor. State variables include but are not limited to: species concentrations, temperature and pressure. A well-stirred reactor is an often used approximation in chemical engineering, and refers to an ideal zero dimensional reactor, i.e., a reactor in which everywhere all state variables are constant. One of the modifications to the reaction conditions that result from the well-stirred reactor condition is that of preference of one set of product channels over another according to the order of the reaction in the kinetic rate laws. For example, if fullerenes formation is higher order in fuel concentration than CO formation, then increasing fuel concentration will favor fullerene formation over CO production. Alternatively, if a by-product formation or fullerene consumption pathway is higher order in a fullerene intermediate than fullerenes formation then dilution of this fullerene intermediate will favor the fullerene pathway over the fullerene consumption or by-product formation pathway. It is not necessary to have the intense mixing of different regions within the reactor for the well-mixed approximation to hold, since a high rate of recycle with good mixing of the recycled material with the feed approximates a well-stirred reactor (such as described in FIG. 1). In the primary zone shown in FIG. 1, the fuel, oxidant, diluent and/or other additives enter at locations 100, and the exhaust exits at location 101. The mixing and reaction of first combustion products (from B) with entering fuel and/or oxidant, and/or newly formed combustion products, and/or unreacted residue (at A) is accomplished by a physical recycle loop.

This type of recycle reactor, where entering fuel and/or oxidant is mixed and reacted with first combustion products, falls within the scope of the present invention. It is understood in the art that the well-stirred reactor is an ideal mathematical construct which is not perfectly realized in any physical embodiment. And, it is not necessary that the state variables in the regions described here approach constancy to a high precision, but only to the extent where roughly practical or useful.

Figure 2:
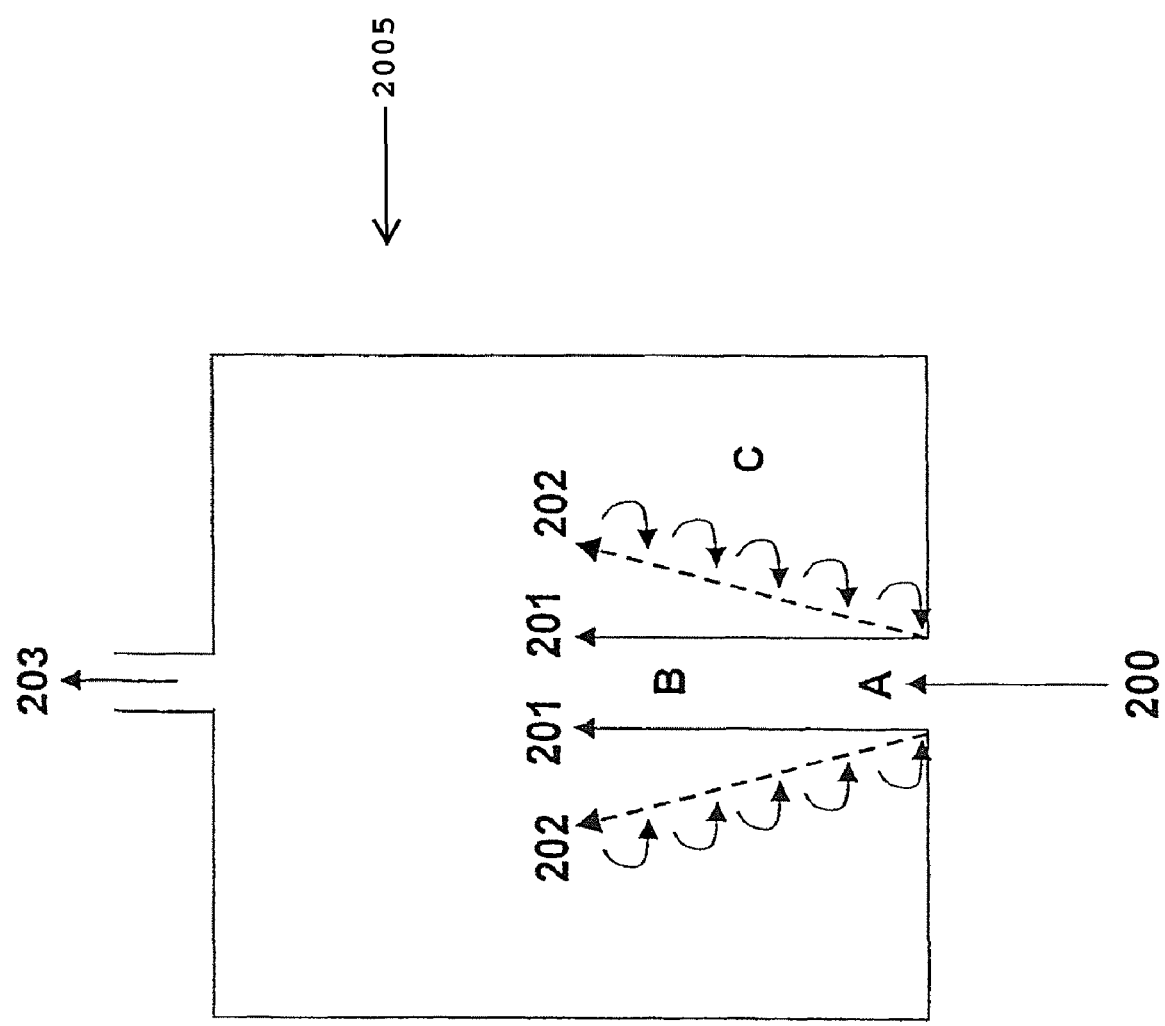
FIG. 2 shows a primary zone reactor where the mixing and reaction of first combustion products with entering fuel and/or oxidant, and/or newly formed combustion products, and/or unreacted residue is accomplished primarily by jet entrainment. Primary zone first combustion products from C mix and react with entering fuel and/or oxidant at A and with newly formed combustion products and unreacted residue at B.

To gain further advantages, it is desirable to construct the primary zone so that it consists of a hold-up chamber with one or more entering streams. This provides an efficient method of flame stabilization and allows the use of high rates of flow for incoming flow streams. Jets (a jet refers to a flow from an orifice into a space large enough to allow expansion of the flow; see FIG. 2) can be used if stabilized in such a chamber, because the normal limitations dictated by flame speed, which determines the possible rates of incoming fuel and/or oxidant, can be overcome. In the primary zone shown in FIG. 2, the fuel, oxidant, diluent and/or other additives enter at location 200, and the exhaust exits at location 203. Arrows 201 are flow paths if no surrounding fluids were entrained (non jet flow). Arrows 201 are flow paths due to entrainment of surrounding fluids (jet flow).

The mixing and reaction of first combustion products with entering fuel and/or oxidant, and/or newly formed combustion products, and/or unreacted residue is accomplished primarily by jet entrainment. Primary zone first combustion products from C mix and react with entering fuel and/or oxidant at A and with newly formed combustion products and unreacted residue at B.

If jets are used as the source of incoming fuel and/or oxidant, then by enhancing the effect of jet entrainment, the jets may be used to accomplish the mixing and reaction of each incoming stream with the first combustion products present in the primary zone. Since at the low pressures typically necessary for fullerene formation, low fluid densities lead to low Reynold's numbers, turbulence is more difficult to achieve and entrainment is a useful mechanism for achieving mixing. The flow in the jets described here as the mechanism for recycle or back-mixing may be laminar or turbulent, as entrainment occurs in either case.

Figure 3:
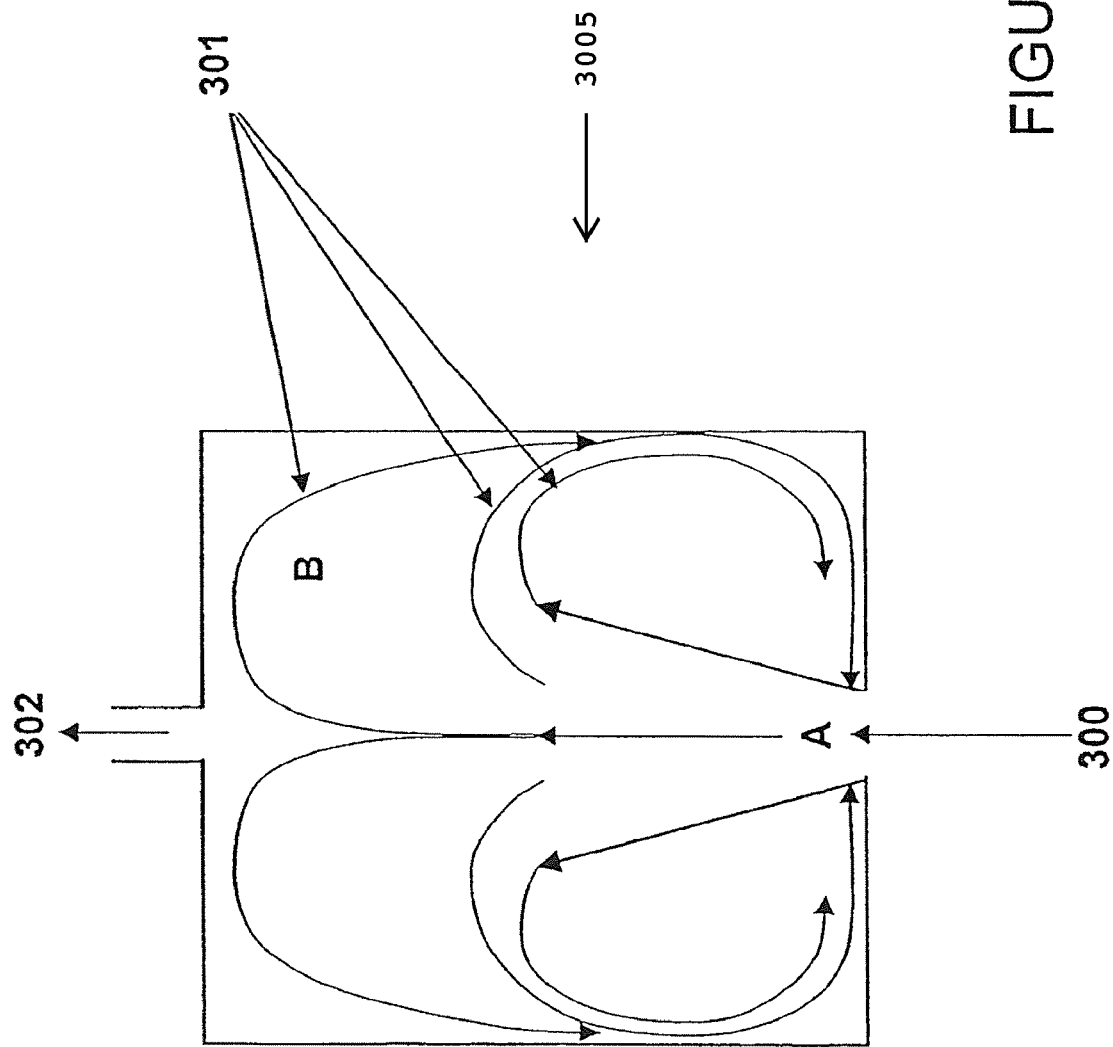
FIG. 3 shows a primary zone reactor where the mixing and reaction of first combustion products with entering fuel and/or oxidant, and/or newly formed combustion products, and/or unreacted residue is accomplished primarily by large scale recycle patterns. Primary zone first combustion products from B mixes and reacts with entering fuel and/or oxidant, and/or newly formed combustion products, and/or unreacted residue components at A.
Figure 4:
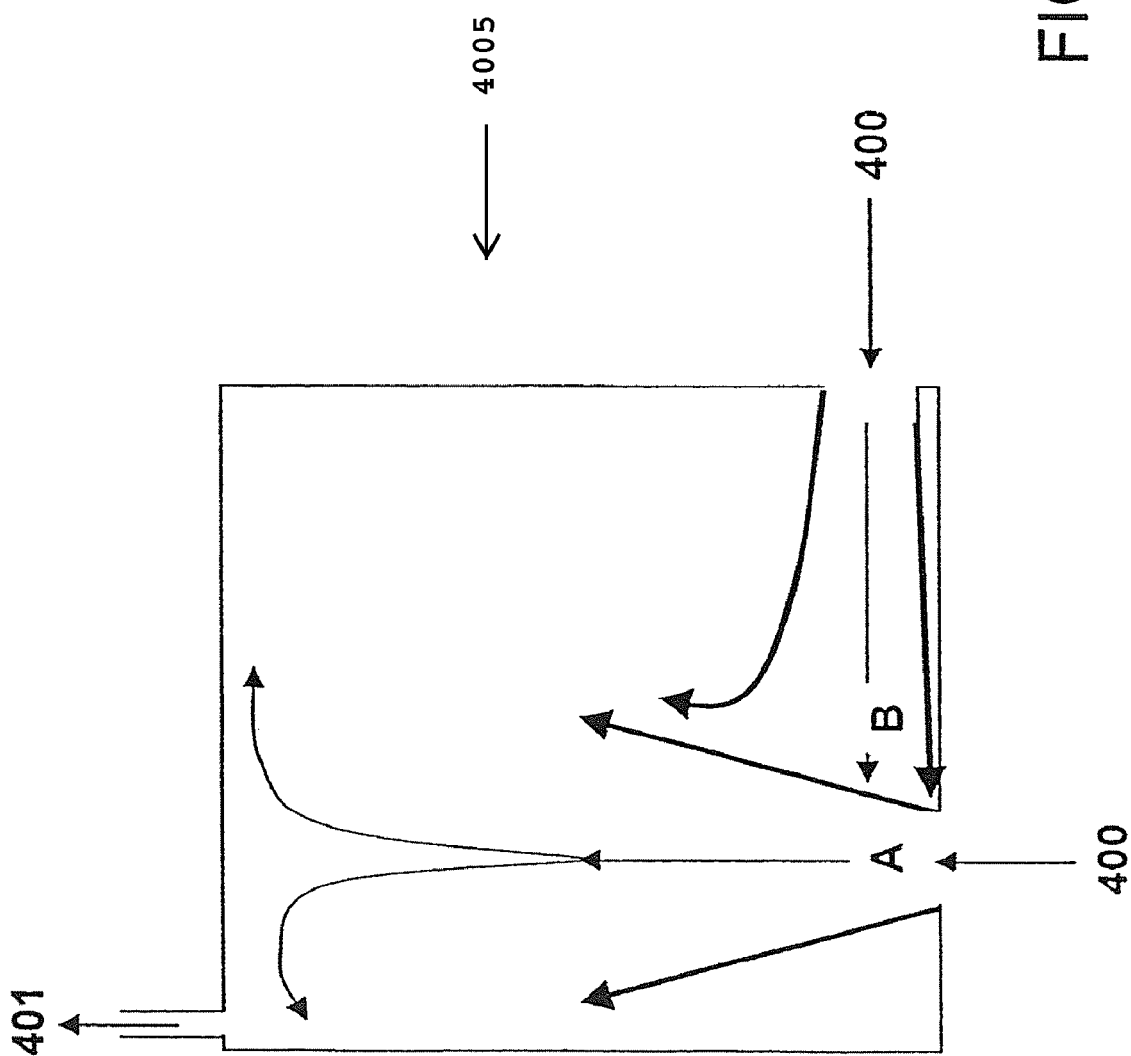
FIG. 4 shows a primary zone reactor where the mixing and reaction of first combustion products with entering fuel and/or oxidant, and/or newly formed combustion products, and/or unreacted residue is accomplished primarily by intersecting jet flows. Primary zone first combustion products from B mixes and reacts with entering fuel and/or oxidant, and/or newly formed combustion products, and/or unreacted residue components at A.

The jets can also be positioned in the primary zone such as to develop larger scale recycles (see FIG. 3), and also positioned so that incoming streams encounter an intersecting flow which results in mixing and reaction of incoming components with first combustion products present in the primary zone (see FIG. 4). In the primary zone shown in FIG. 3, the fuel, oxidant, diluent and/or other additives enter at location 300, and the exhaust exits at location 302. Arrows 301 shows large recycle flow patterns. The mixing and reaction of first combustion products with entering fuel and/or oxidant, and/or newly formed combustion products, and/or unreacted residue is accomplished primarily by large scale recycle patterns. Primary zone first combustion products from B mixes and reacts with entering fuel and/or oxidant, and/or newly formed combustion products, and/or unreacted residue components at A. In the primary zone shown in FIG. 4, the fuel, oxidant, diluent and/or other additives enter at locations 400, and the exhaust exits at location 401. The mixing and reaction of first combustion products with entering fuel and/or oxidant, and/ or newly formed combustion products, and/or unreacted residue is accomplished primarily by intersecting jet flows. Primary zone first combustion products from B mixes and reacts with entering fuel and/or oxidant, and/or newly formed combustion products, and/or unreacted residue components at A.

Figure 5:
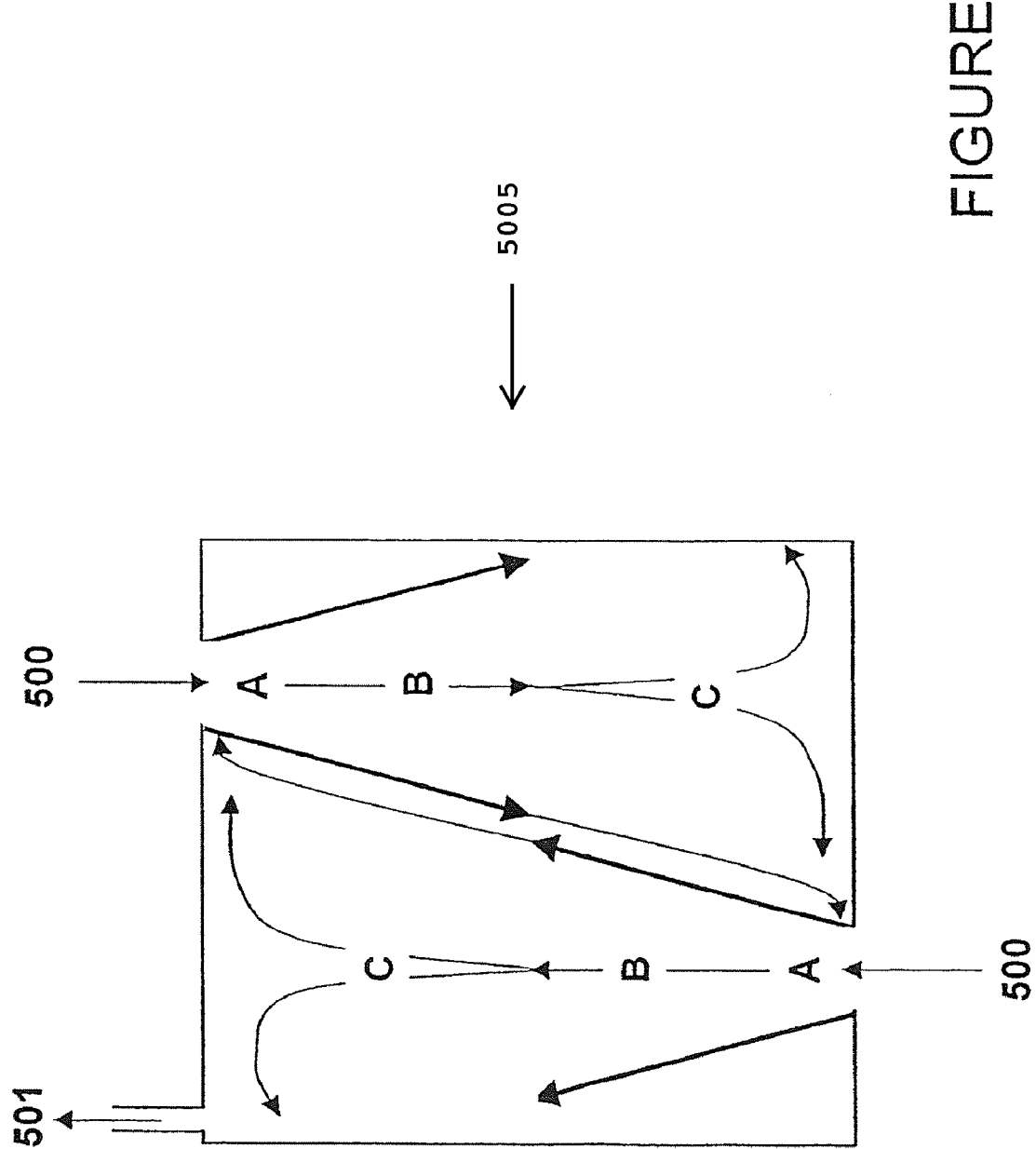
FIG. 5 shows a primary zone reactor where the mixing and reaction of first combustion products with entering fuel and/or oxidant, and/or newly formed combustion products, and/or unreacted residue is accomplished by jet entrainment, large scale recycle patterns, and intersecting jet flows. Primary zone first combustion products from B mixes and reacts with entering components at A.

By positioning the jets in a manner so that one jet is opposite another jet, but not directly opposite so that too much momentum of the jets is lost, entrainment is enhanced, which enhances the mixing and reaction of the incoming stream and early combustion products with the later combustion products (see FIG. 5). In the primary zone shown in FIG. 5, the fuel, oxidant, diluent and/or other additives enter at locations 500, and the exhaust exits at location 501. The mixing and reaction of first combustion products with entering fuel and/ or oxidant, and/or newly formed combustion products, and/or unreacted residue is accomplished by jet entrainment, large scale recycle patterns, and intersecting jet flows. Primary zone first combustion products from B and C mix and react with entering components at A.

Figure 13:
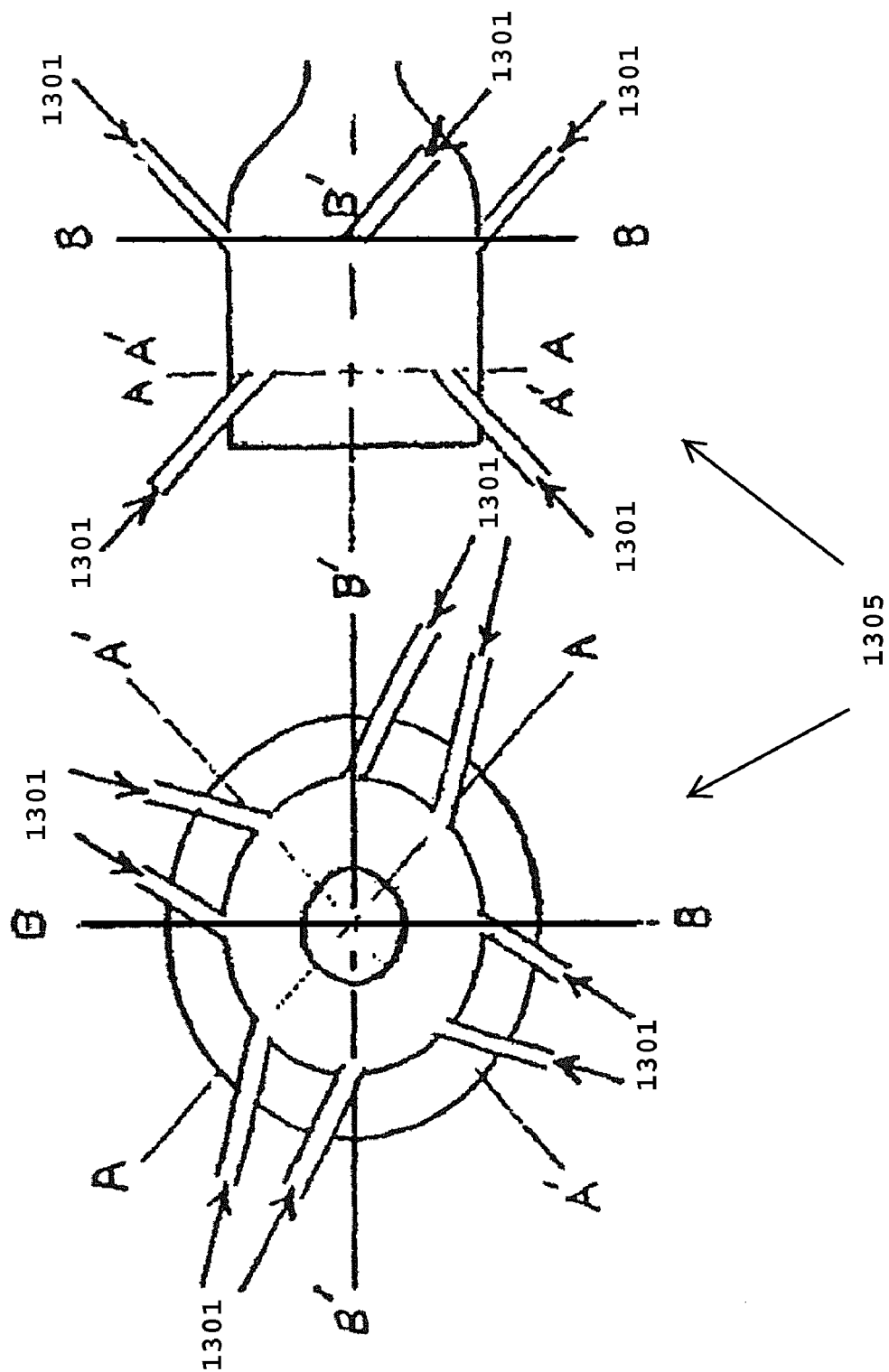
FIG. 13 shows a primary zone reactor that has two sets of injection tubes at two axial positions, A-A/A'-A' and B-B/B'-B'. The tubes in section A-A/A'-A' each make an angle of about 30 degrees with a radius of the cylinder and an angle of about 45 degrees with the longitudinal axis of the cylinder. The feed emerging from the tubes in section A-A/A'-A' is opposed and offset to the feed emerging from the tubes in section B-B/B'-B'.

A reactor chamber that utilizes opposed and offset jets such as the one shown in FIG. 5 takes advantage of large scale recycles, enhanced jet entrainment, and also intersecting flows of earlier and later residence time material. FIG. 13 shows another configuration of opposed, offset jets in a reactor chamber.

Figure 6:
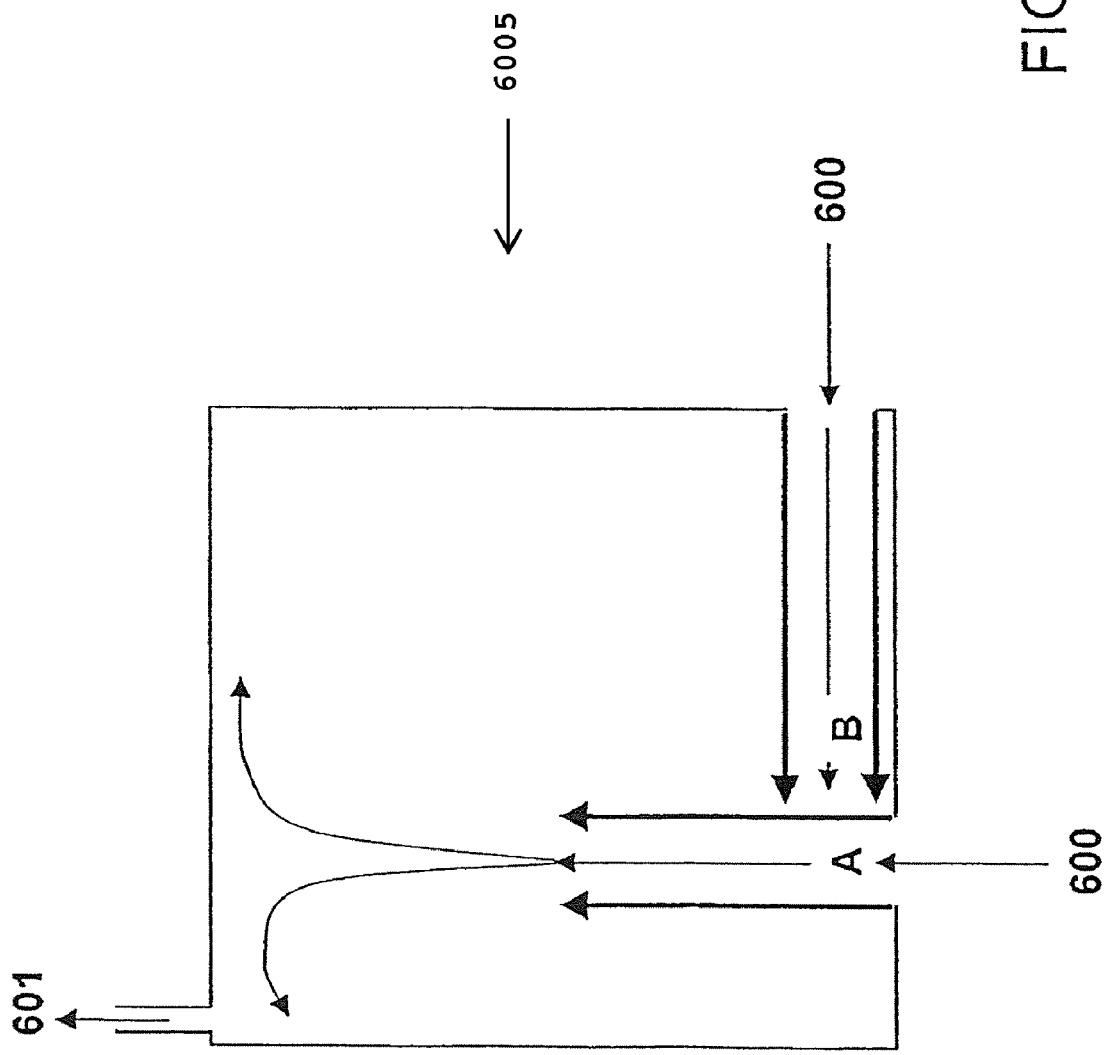
FIG. 6 shows a primary zone reactor where the mixing and reaction of first combustion products with entering fuel and/or oxidant, and/or newly formed combustion products, and/or unreacted residue is accomplished primarily by intersecting non-jet flows. Primary zone first combustion products from B mixes and reacts with entering fuel and/or oxidant, and/or newly formed combustion products, and/or unreacted residue components at A.

Flows may also be positioned so that one flow encounters another flow, the latter flow being composed of first combustion products and the first flow being composed of newly formed combustion products, fuel and/or oxidant, and/or unreacted residue, but the flows are not jet flows (see FIG. 6). In the case where large scale recycles and/or intersection of flows is adequate, it may not be necessary to use jet flows. In the primary zone shown in FIG. 6, the fuel, oxidant, diluent and/or other additives enter at locations 600, and the exhaust exits at location 601. The mixing and reaction of first combustion products with entering fuel and/or oxidant, and/or newly formed combustion products, and/or unreacted residue is accomplished primarily by intersecting non-jet flows. Primary zone first combustion products from B mixes and reacts with entering fuel and/or oxidant, and/or newly formed combustion products, and/or unreacted residue components at A.

Figure 7:
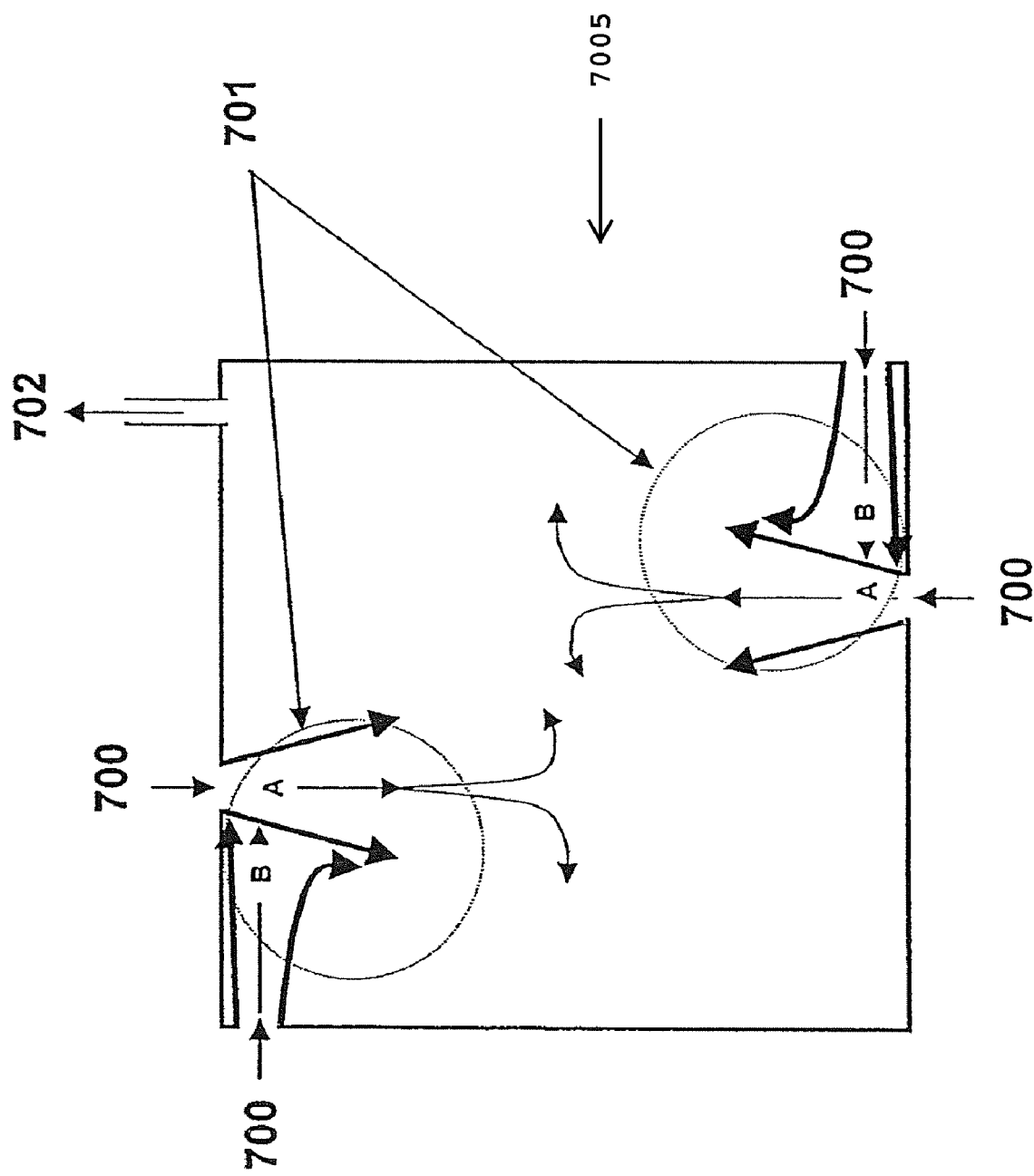
FIG. 7 shows a primary zone reactor where the mixing and reaction of first combustion products with entering fuel and/or oxidant, and/or newly formed combustion products, and/or unreacted residue is accomplished primarily by intersecting jet flows, with sufficient efficiency so that the circled regions are areas where one or more state variables are approximately constant, and are at least 10%, preferably at least 60%, most preferably at least 80% of the total primary zone volume. Primary zone first combustion products from B mixes and reacts with entering fuel and/or oxidant, and/or newly formed combustion products, and/or unreacted residue components at A.

To obtain a primary zone with at least 10% of the primary zone having state variables approximately constant, it may be preferred to position numerous intersecting or other flows in the reactor (see FIG. 7). In the primary zone shown in FIG. 7, the fuel, oxidant, diluent and/or other additives enter at locations 700, and the exhaust exits at location 702. Regions 701 are regions in the primary zone where state variables (e.g. concentration, pressure, temperature) are approximately constant. These regions comprises at least 10% of the total primary zone volume. The mixing and reaction of first combustion products with entering fuel and/or oxidant, and/or newly formed combustion products, and/or unreacted residue is accomplished primarily by intersecting jet flows, with sufficient efficiency so that the circled regions are areas where one or more state variables are approximately constant, and are at least 10%, preferably at least 60%, most preferably at least 80% of the total primary zone volume. Primary zone first combustion products from B mixes and reacts with entering fuel and/or oxidant, and/or newly formed combustion products, and/or unreacted residue components at A.

Previous methods of obtaining a well-mixed combustor have relied primarily on high flow rates to induce turbulence on the total flow within the reactor volume to achieve high levels of micro-mixing, which is not as effective at the low pressures necessary to achieve fullerene formation by combustion, and so the methods mentioned above are useful. The present invention, however, encompasses mixing reactor systems for combustion synthesis of fullerenic product which have a degree of turbulence or rely primarily on turbulence systems as well.

By constructing the primary chamber so that a large proportion of the volume is mixed efficiently, the possibility is allowed of using a non-vaporizable fuel or additive. It is necessary to efficiently mix any injected fuel or additive to gain the maximum advantage of reaction with the first combustion products. As an example, some flows to the primary zone could be a non-fullerene-forming fuel premixed in gaseous form with an oxidant, and a liquid fullerene-forming fuel, fed so as to mix and react with the combustion products of the premixed non-fullerene-forming fuel and oxidant.

Accomplishing the recycle or back-mixing in an enclosed primary zone, which effectively serves as a hold-up chamber, allows for a surface area contacting the flame by which heat transfer can be more efficiently accomplished than for conventional flames stabilized on cooled burners and not contacting hot surfaces. Heating or cooling by outside sources and use of thermal insulation can be accomplished by the present invention more readily than in conventional fullerenic product synthesis systems. Conditions where maintenance of heat losses is necessary, such as the use of air as oxidant, can be easily attained by the use of the primary zone for flame stabilization and minimizing heat losses through efficient insulation of the primary zone or by external heating of the primary zone. In this way, efficient control of temperature is also possible at conditions not easily attainable with a conventional flame. For instance, consider the need in a given practical situation to maintain a constant temperature of 2100 K for the reaction of a fullerene-forming fuel and oxidant for a residence time of 300 ms. Since a conventional flame has different rates of heat release at different residence times or distances from the burner, a method for varying the heating rate as a function of residence time or distance from the burner would be needed for a conventional system. The heating rate would have to be lower at the oxidation region and higher in the post-flame zone. Such control would be very difficult to accomplish with a conventional flame, but is easily provided by the present invention.

Since the primary zone functions as an efficient method to stabilize a reactive flame system, it can be used in conjunction with other reactor types, functioning as a stabilization zone, and serving to maintain the flame radical chain reactions by allowing mixing and reaction of flame radicals with incoming fuel and oxidant. The mixture of combustion products to which the fullerene-forming fuel and any other fed constituents such as oxidant, diluents, or additives are added effectively act as a continuous ignition source and allows much greater throughputs of fuel and oxidant.

Figure 8:
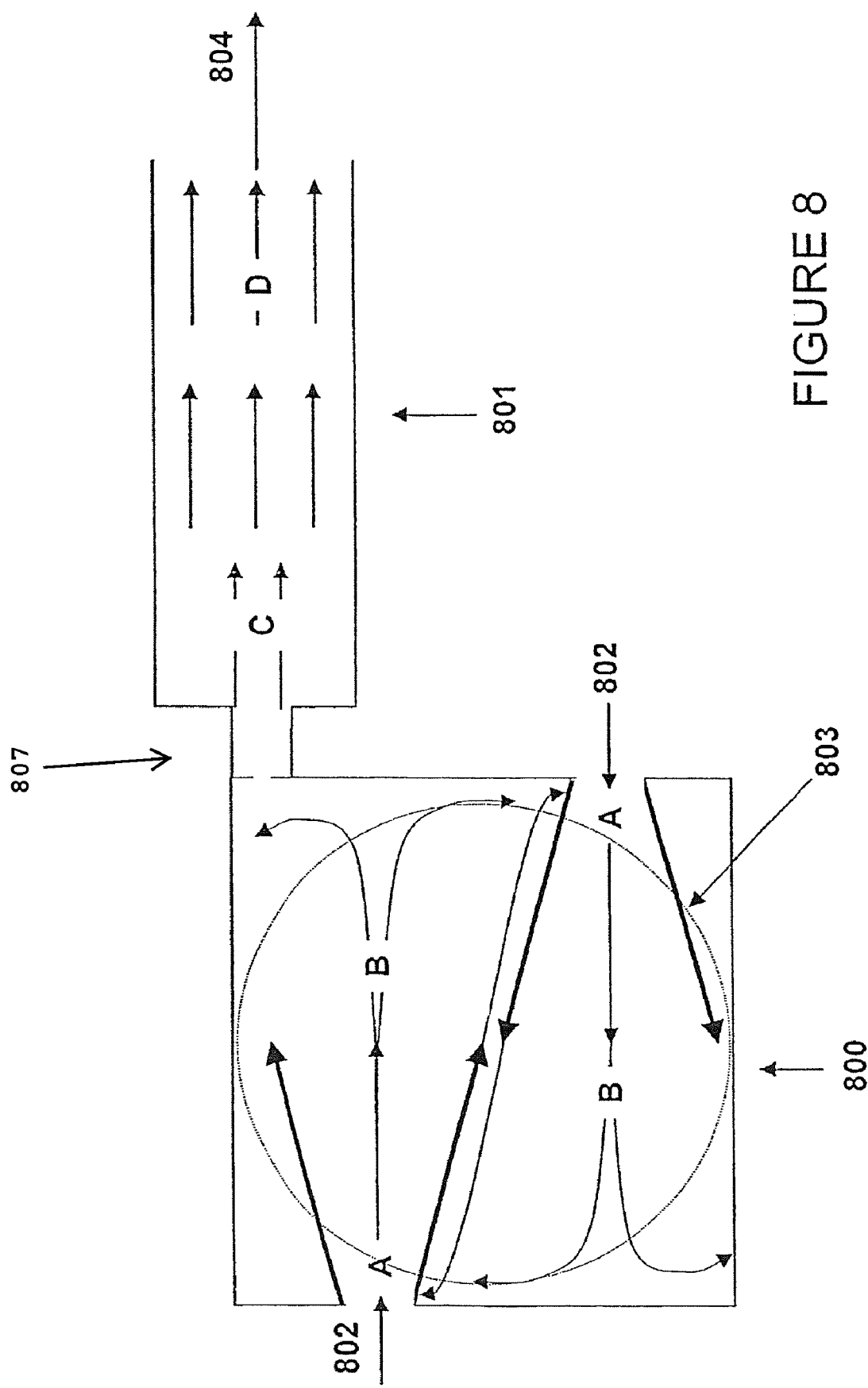
FIG. 8 shows a primary zone reactor in conjunction with a secondary zone reactor. In the primary zone reactor, the mixing and reaction of first combustion products with entering fuel and/or oxidant, and/or newly formed combustion products, and/or unreacted residue is accomplished by jet entrainment, large scale recycle patterns, and intersecting jet flows. Primary zone first combustion products from B mixes, and reacts with entering components at A. Effluent from the primary zone enters the secondary zone where combustion products from D do not mix or react with entering components at C.
Figure 9:
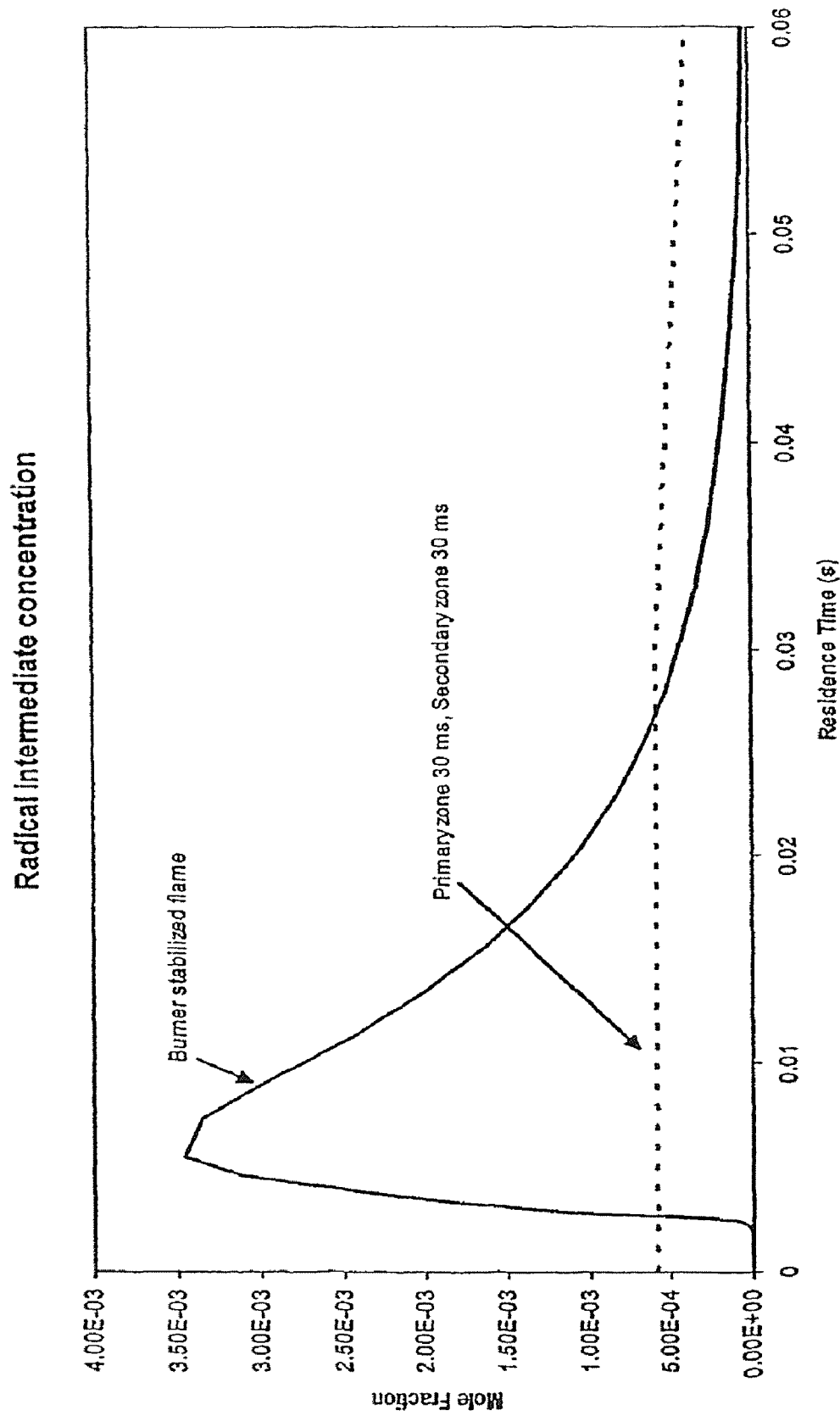
FIG. 9 is a graph showing the mole fraction of radical intermediates versus the residence time according to a conventional method and a method of the present invention.

It is desirable under certain circumstances to control the concentrations of radical intermediates since they significantly affect or even control the formation and destruction of fullerene intermediates and products and other fullerenic products. Use of a primary zone allows the oxidation zone, which is the region of high radical concentrations and the region where concentrations of key intermediates are determined, to be decoupled from the post-flame zone, and different residence times or variable rates of heating or cooling to be used so as to control the radical concentrations by allowing the oxidation reactions to occur over a longer residence time or at a different, constant temperature. In conventional methods of combustion synthesis of fullerenic product, the environment of the oxidation zone is determined by the requirements of flame stabilization. When the primary zone is constructed so that recycle or back-mixing is adequate for the whole volume to approximate a well-stirred reactor, the concentrations of radicals in the primary zone are sufficiently reduced so that high peak concentrations are avoided (see FIG. 9). In FIG. 8, a primary zone 800 is coupled with a secondary zone 801. In the primary zone 800, the fuel, oxidant, diluent and/or other additives enter at locations 802. A region 803 is a region in the primary zone where state variables (e.g. concentration, pressure, temperature) are approximately constant. The secondary zone components move along the direction shown by an arrow 804 to collection. In the primary zone reactor, the mixing and reaction of first combustion products with entering fuel and/or oxidant, and/or newly formed combustion products, and/or unreacted residue is accomplished by jet entrainment, large scale recycle patterns, and intersecting jet flows. Primary zone first combustion products from B mixes, and reacts with entering components at A. Effluent from the primary zone enters the secondary zone where combustion products from D do not mix or react with entering components at C.

Figure 10:
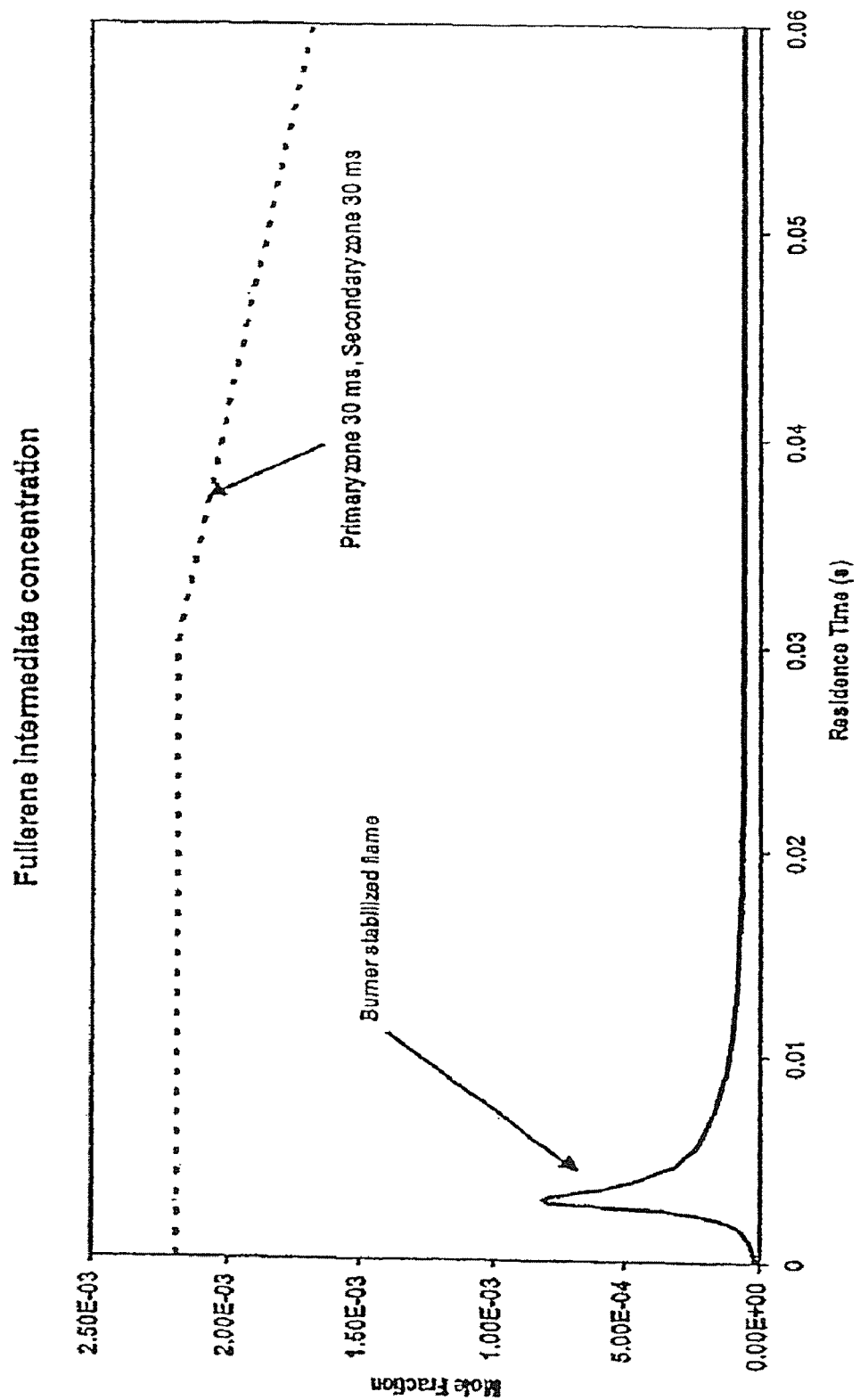
FIG. 10 is graph showing the mole fraction of fullerene intermediates versus the residence time according to a conventional method and a method of the present invention.

Also, concentrations of fullerene intermediates can be increased and maintained for longer residence times than with conventional systems (see FIG. 10). The control over radical and fullerene intermediate concentrations allows fullerenic product formation pathways to be favored over competitive pathways, and fullerenic product formation to be promoted.

Also, since the temperature and residence time of the oxidation region are constrained by the limits of flame stabilization for the conventional combustion methods of fullerenic product synthesis, it is not possible with the conventional synthesis method to decouple the conditions that promote formation of fullerenic product from the conditions necessary to stabilize the flame system. Flame speed increases strongly as temperature increases, and at lower temperatures where flame speed is lower, much less fuel and oxidant can be fed to the flame. The residence time required for oxidation is determined by temperature and other conditions. Use of the primary zone allows the temperature, residence time, and feed rate of fuel and oxidant to the oxidation zone to be varied separately by use of reactor volume and rate of heating or cooling as variable parameters. So, for a given feed rate, the reactor volume and rate of heating or cooling can be varied to obtain the conditions that promote and/or favor fullerenic product formation.

A further aspect of the present invention is the use of a secondary zone that consists of either a collection device for the fullerenic product or products formed in the primary zone (as described in U.S. Provisional Application No. 60/393,494) or a reactor section that allows for further reaction of the effluents of the primary zone.

In the case where further reaction is preferable, it is desirable that species from different regions in the secondary zone corresponding to different residence times are kept from significant mixing and reaction with each other. This can be accomplished practically by having the flow sufficiently turbulent and of sufficiently high velocity so that the secondary reactor approximates a plug-flow reactor without axial mixing, or by having a laminar flow such that the rate of axial diffusion of key intermediates or fullerenic products is not high enough to give a significant amount of back-mixing. Practically, the rate of axial diffusion or back-mixing resulting from concentration gradients relative to the rates of reaction in the secondary zone is low enough to be neglected and plug-flow assumed even in cases of laminar flow with a fully formed (not flat) velocity profile. The present invention encompasses cases where the secondary zone has laminar or turbulent flow. Fuel and/or oxidant and/or additives may be injected at a location in the secondary zone to promote and/or favor fullerenic product formation. The secondary zone is preferably embodied by a pipe section, preferably with insulation and with the capability to heat or cool as desired, and with a region at the beginning of the secondary zone for injection of fuel and/or oxidant and/or additives, such as a narrow throat section that enhances the fluid velocity. The secondary zone allows for the gaeous effluent of a combustor to flow for a desired residence time at a controllable temperature.

The secondary zone allows for much longer residence times for fullerene formation reactions to occur than is provided by conventional systems used for fullerene product synthesis. Typically, conventional systems used for fullerene product synthesis have a total reaction residence time of 100-300 ms, after which temperatures have dropped to levels too low to support reaction due to heat losses. The secondary zone allows for maintenance of the combustion mixture at temperatures high enough to support reaction indefinitely, preferably in the range of 1 to 10 s, by the use of insulation, heating or cooling of the secondary zone. A conventional flame system can also be used to feed combustion and fullerene intermediates to the secondary zone, where they are allowed to react at a temperature for the desired residence time.

The preferred ranges of operating parameters are as follows: residence time in the primary zone is preferred in the range of 2 to 500 ms, residence time in the secondary zone in the range of from 5 ms to 10 s, total overall equivalence ratio is preferred in the range of from 1.8 to 4.0, pressure in the range of from 10 torr to 400 ton, preferably in the range of from 20 ton to 200 ton, most preferably in the range of from 20 ton to 80 ton, and temperature of the primary and secondary zones in the range of from 1500 K to 2500 K. Benzene is a preferred fullerene-forming fuel. Any non-fullerene forming fuel can be used, methane being preferred due to cost and availability.

Reactor

As used herein, means for introducing a carbon-containing fuel and an oxidant includes elements 100, 200, 300, 400, 500, 600, 700, 802, and 1301 shown in FIGS. 1, 2, 3, 4, 5, 6, 7, 8, and 13, respectively.

As used herein, means for mixing said carbon-containing fuel and said oxidant under non-turbulent conditions and reacting said fuel and oxidant to form a combustion product under subatmospheric conditions includes elements 1005, 2005, 3005, 4005, 5005, 6005, 7005, 8005, and 1305 shown in FIGS. 1, 2, 3, 4, 5, 6, 7, 8, and 13, respectively.

As used herein, means for producing fullerenic products from said combustion mixture includes elements 1005, 2005, 3005, 4005, 5005, 6005, 7005, 801, 8005, and 1305 shown in FIGS. 1, 2, 3, 4, 5, 6, 7, 8, and 13, respectively.

As used herein, means for introducing an additive includes elements 100, 200, 300, 400, 500, 600, 700, 802, 801, 807, and 1301 shown in FIGS. 1, 2, 3, 4, 5, 6, 7, 8, and 13, respectively.

The following examples serve to illustrate the spirit of the present invention but do not limit its scope. For example, different equivalence ratios, pressures, residence times, fuels, methods of introduction of feeds, collection methods, etc. could be used and still be within the scope of the present invention.

EXAMPLES

Example 1

A primary zone is used coupled to a secondary zone, the effluent of which proceeds to a collection device as described in U.S. Provisional Application No. 60/393,494. The primary zone consists of a short cylindrical chamber where 34, 0.02" openings to allow the addition of gases are positioned at opposite faces or ends of the cylinder, so as to form jets, each jet pointing at the other face. The jets of each face are positioned so as to be equidistant from the center of the opposite adjacent jets, in other words, offset from the opposite jet centerlines, so as to minimize momentum loss of the entering fluid and to enhance entrainment of the opposing jets. A pre-mixed benzene (a fullerene-forming fuel), $O_2$, Ar mixture (Ar=10% of total entering stream) at an equivalence ratio of 2.4 is used and exits the jets at a velocity of 133 m/s at a temperature of 90° C. and pressure of 40 ton. The volume of the primary zone is 460 cc, so that the average residence time in the primary zone is approximately 30 ms. External heating is applied so that the temperature of the primary zone is maintained at 1700 K.

The flow conditions of the jet streams is laminar and the overall primary zone volume is such that the Reynold's number of the primary zone is less than 2000. However, the degree of entrainment is sufficient so that there are sufficient regions of constant state variables in the primary zone so that it may be approximated as a well-stirred reactor.

Figure 11:
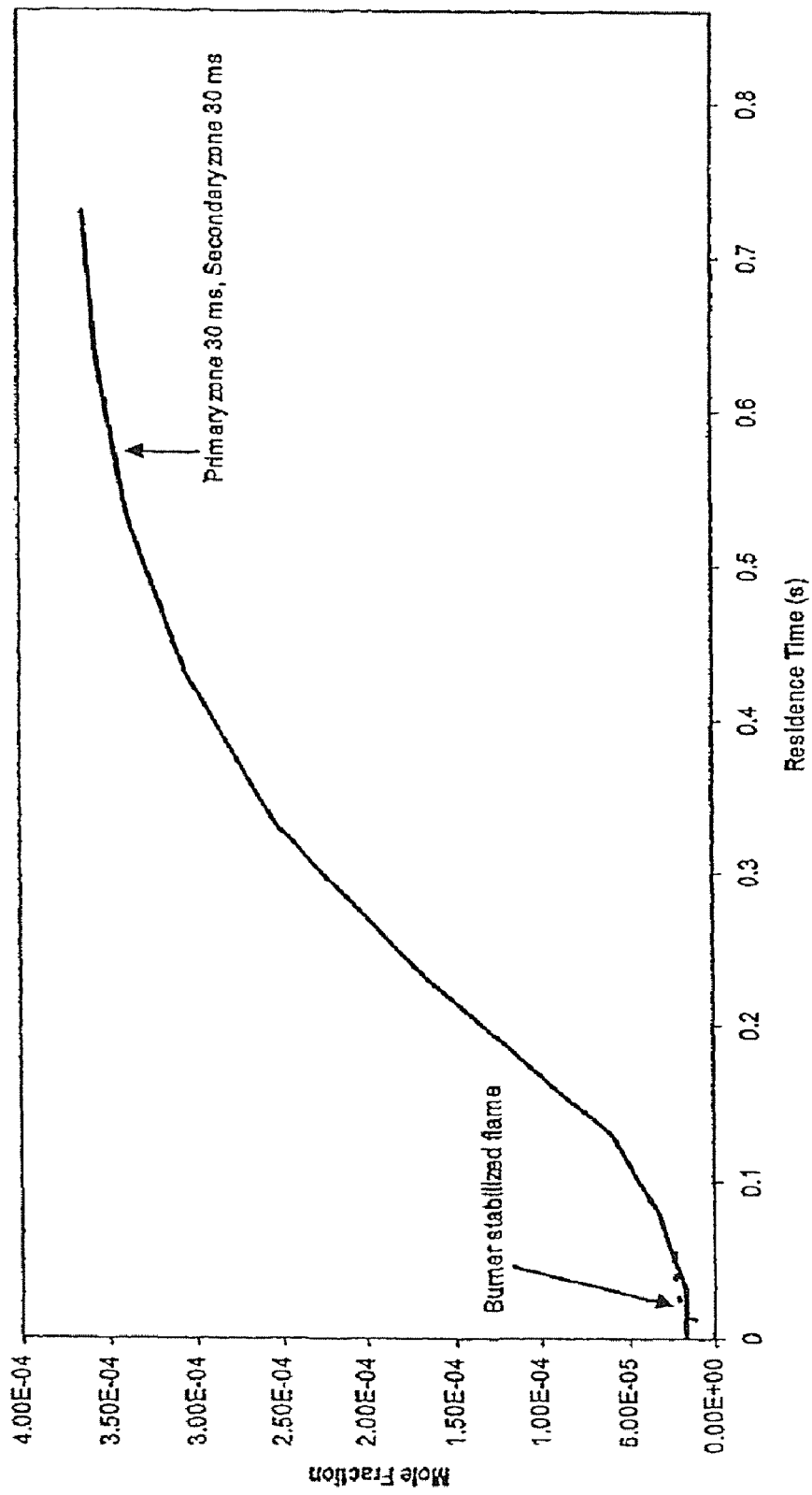
FIG. 11 is graph showing the mole fraction of $C_{60}$ fullerene versus the residence time according to a conventional method and a method of the present invention.

Combustion takes place in the primary zone, forming combustion intermediates and a certain amount of fullerenic product. The effluent of the primary zone enters a secondary zone, consisting of an insulated throat section of 2" diameter and 4" in length, connected to an insulated pipe of 6" diameter and 4' in length, heated so as to maintain a constant temperature of 1700 K. The effluent of the secondary chamber, which consists of fullerene product and combustion by-products enters a collection device as described in U.S. Provisional Application No. 60/393,494. The total residence time of the combustion reaction is approximately 1 s before collection. FIG. 11 shows results from a study of $C_{60}$ concentration as a function of residence time for this system, as well as for a conventional combustion synthesis method. It can be seen that the concentration of fullerenes in this example far exceeds that of the conventional synthesis method. This improvement is due to the well-mixed character of the primary zone and the longer residence times allowed at controlled temperature.

Example 2

Figure 12:
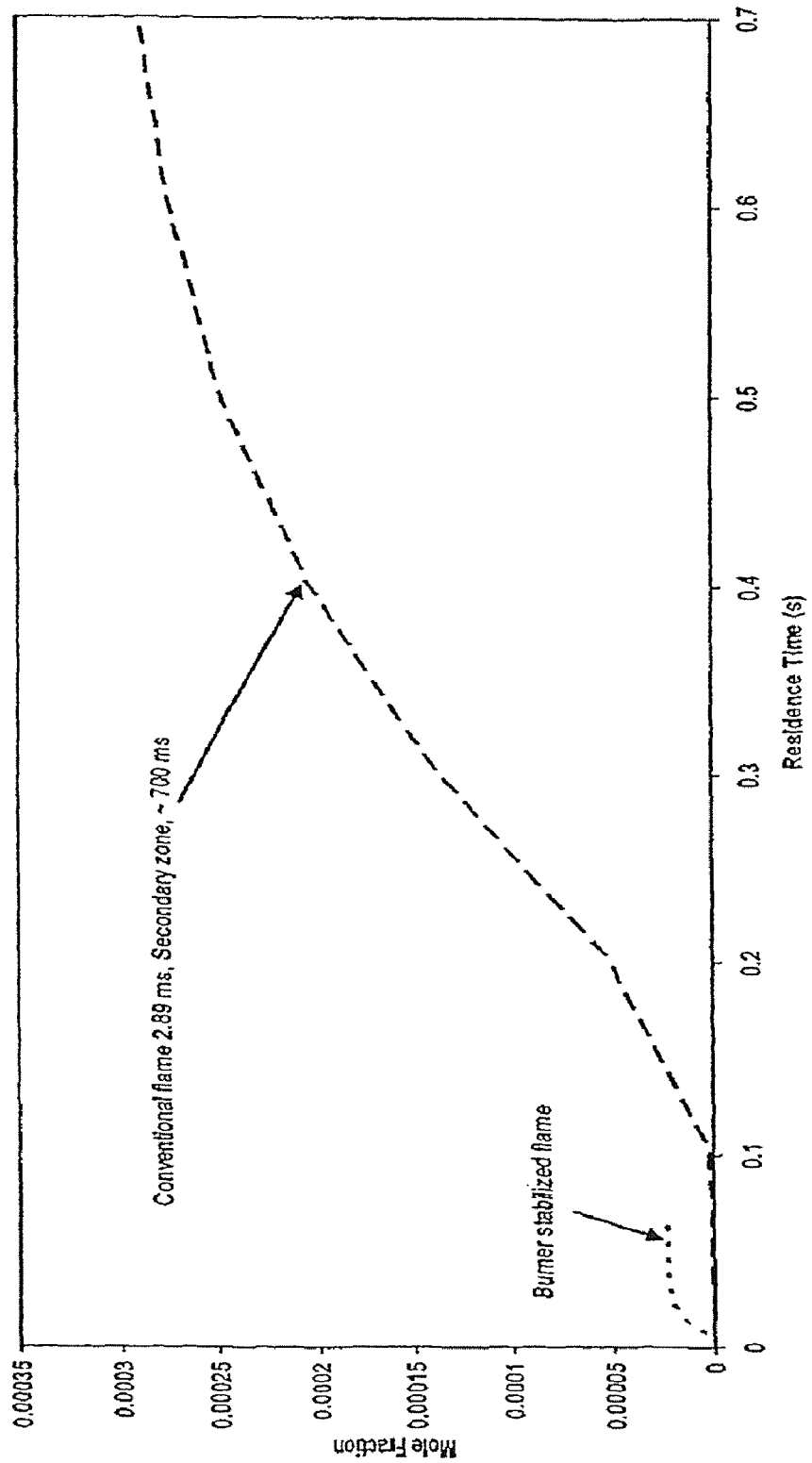
FIG. 12 is graph showing the mole fraction of $C_{60}$ fullerene versus the residence time according to a conventional method and a method described in Example 2.

The same system and conditions as described in Example 1 are used, except that the primary zone is replaced with a flame system such as described in U.S. Pat. No. 5,273,729. FIG. 12 shows results of a study of $C_{60}$ concentration as a function of residence time for this system. It can be seen that the concentration of fullerenes in this example far exceeds the conventional synthesis method. The improved performance results from the ability to allow for longer residence times at controlled temperature. This example is limited to a lower throughput than Example 1, because of the stability limits of the conventional flame which feeds the secondary zone.

Example 3

The same system is used as described in Example 1, except that the effluent of the primary zone proceeds to a collection device as described in U.S. Provisional Application No. 60/393,494.

Example 4

The same system is used as described in Example 1, except that the primary zone is operated at an equivalence ratio of 2.0 and additional benzene in gaseous form is added into the throat section so that the overall equivalence ratio of the system is 2.4.

Example 5

The same system as described in Example 1 is used, except that a conventional burner is used to stabilize a methane/$O_2$/Ar flame at equivalence ratio of 1.0 and pressure of 1 atm., which produces non-fullerene containing combustion intermediates that are fed into the primary zone.

Benzene is added into the primary zone in gaseous form so that the overall equivalence ratio in the primary zone is 2.4.

Example 6

The same system is used as described in Example 3, except that the benzene is replaced with #6 fuel oil, which is fed in liquid form.

Example 7

The same system is used as described in Example 1, however a halogenated species is injected into the throat section, so as to increase the extent of fullerene formation in the secondary zone.

Example 8

The same system is used as described in Example 1, except that air is used in place of $O_2$.

Example 9

The same system is used as described in Example 1, except that a halogenated species is premixed along with the benzene, $O_2$, Ar mixture.

Example 10

The same system is used as described in Example 1, except that benzene, $O_2$, and Ar are fed separately into the primary zone through different jets.

Example 11

The same system is used as described in Example 1, except that the primary zone consists of one nozzle feeding into a chamber held at 100 ton, the flow of the gases from the nozzle being such as to create a laminar jet which entrains the surrounding fluid, thus creating a recycle, the surrounding fluid containing first combustion products. The flow in the primary zone is laminar. The primary zone cannot accurately be approximated as well-mixed in this case, but the premixed fuel and oxidant flow rates made possible by this arrangement are higher than if the nozzle were not located in the primary zone. The higher flow rates are due to a recycle of the reactive flame intermediates present in the first combustion products of the primary zone.

Example 12

A nozzle type flame system, consisting of an open pipe with a methane/$O_2$Ar (the methane being a non-fullerene forming fuel) flame stabilized at the end, is used to produce combustion intermediates which are fed into a primary zone consisting of a chamber with an opening through which the aforementioned combustion intermediates enter in a laminar jet flow and a separate opening through which a coal-derived tar (the fullerene-forming fuel) enters. The coal-derived tar is fed into the primary zone in liquid form. Combustion products and fullerenic product are formed in the primary zone. The effluent of the primary zone is then fed to a collection system consisting of a filter. The methane flame is operated at 1 atm, and the primary zone is operated at a pressure of 100 ton.

Example 13

A nozzle type flame system, consisting of an open pipe with a methane/$O_2$Ar (the methane being a non-fullerene forming fuel) flame stabilized at the end, is used to produce combustion intermediates which are fed into a primary zone consisting of a chamber with an opening through which the aforementioned combustion intermediates enter in a laminar jet flow and a separate opening through which an intermediate petroleum-derived oil (the fullerene-forming fuel) enters. The intermediate petroleum-derived oil is fed into the primary zone in liquid form. Combustion products and fullerenic product are formed in the primary zone. The effluent of the primary zone is then fed to a collection system consisting of a filter. The methane flame is operated at 1 atm, and the primary zone is operated at a pressure of 100 ton.

Example 14

The same system is used as in Example 12, except that the combustion intermediates formed by the methane flame and the coal derived tar enter the primary zone through the same opening.

Example 15

The same system as described in Example 12 is used, except that the effluent of the primary zone enters a secondary zone consisting of a pipe section, where further reaction is allowed to take place for a residence time of 1 s, before the effluent of the secondary zone enters a filter collection device.

What is claimed is:

1. A reactor for producing fullerenic products or intermediates of fullerenic products, comprising:
a subatmospheric pressure chamber having a first injection inlet for injecting a first feed into said chamber and a second injection inlet for injecting a second feed into said chamber, wherein said first injection inlet and said second injection inlet are positioned so that said first feed emerging from said first injection inlet is opposed and offset to said second feed emerging from said second injection inlet so that said first feed and said second feed are capable of mixing under non-turbulent flow conditions.

2. The reactor of claim 1, wherein said first injection inlet is positioned so that said first feed is directed so as to partially overlap said second feed so that earlier residence time material of said second feed mixes and reacts with later residence time material of said first feed.

3. The reactor of claim 1, wherein said first injection inlet and said second injection inlet are configured to provide a jet flow of said first feed and a jet flow of said second feed.

4. The reactor of claim 1, wherein said first injection inlet and said second injection inlet are positioned to result in large scale recycle flow, jet entrainment, intersecting jet flow, or combinations thereof within said chamber.

5. The reactor of claim 1, wherein first injection inlet and said second injection inlet are configured so that said first feed and said second feed mix using non-turbulent flow.

6. The reactor of claim 1, wherein said reactor comprises a plurality of said first inlet and a plurality of said second inlet.

7. A reactor for producing fullerenic products or intermediates of fullerenic products, comprising:
a subatmospheric pressure chamber having a first injection inlet for injecting a first feed into said chamber and a second injection inlet for injecting a second feed into said chamber, said first injection inlet being positioned with respect to said second injection inlet so that early residence time material of said first feed is entrained into later residence time material of said second feed, later residence time material of said first feed is entrained into early residence time material of said second feed, and intermediate residence time material of said first feed is entrained into intermediate residence time material of said second feed so that said first feed and said second feed are capable of mixing under non-turbulent flow conditions.

8. The reactor claimed in claim 7, wherein said first injection inlet is positioned so that the amount of entrainment of said second feed is enhanced by the flow of said first feed.

9. The reactor of claim 7, wherein said first injection inlet and said second injection inlet are configured to provide a jet flow of said first feed and a jet flow of said second feed.

10. The reactor of claim 7, wherein said first injection inlet and said second injection inlet are positioned to result in large scale recycle flow, jet entrainment, intersecting jet flow, or combinations thereof within said chamber.

11. The reactor of claim 7, wherein first injection inlet and said second injection inlet are configured so that said first feed and said second feed mix using non-turbulent flow.

12. The reactor of claim 7, wherein said reactor comprises a plurality of said first inlet and a plurality of said second inlet.

13. A reactor for producing fullerenic products or intermediates of fullerenic products, comprising:
 means for introducing a carbon-containing fuel and an oxidant;
 means for mixing said carbon-containing fuel and said oxidant under non-turbulent conditions and reacting said fuel and oxidant to form a combustion product under subatmospheric conditions.

14. The reactor of claim 13, further comprising:
 means for producing fullerenic products from said combustion mixture.

15. The reactor of claim 13, further comprising means for introducing an additive.

* * * * *